(12) United States Patent
Dice

(10) Patent No.: US 6,877,088 B2
(45) Date of Patent: Apr. 5, 2005

(54) METHODS AND APPARATUS FOR CONTROLLING SPECULATIVE EXECUTION OF INSTRUCTIONS BASED ON A MULTIACCESS MEMORY CONDITION

(75) Inventor: David Dice, Foxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 532 days.

(21) Appl. No.: 10/039,368

(22) Filed: Jan. 3, 2002

(65) Prior Publication Data

US 2003/0033510 A1 Feb. 13, 2003

Related U.S. Application Data

(63) Continuation-in-part of application No. 09/924,891, filed on Aug. 8, 2001.

(51) Int. Cl.$^7$ .............................................. G06F 12/00
(52) U.S. Cl. ......................................... 712/235; 712/22
(58) Field of Search ........................... 712/235, 22, 28, 712/32; 711/141, 150, 152, 132

(56) References Cited

U.S. PATENT DOCUMENTS

| | | | |
|---|---|---|---|
| 4,908,750 A | | 3/1990 | Jablow |
| 5,197,130 A | * | 3/1993 | Chen et al. ..................... 712/3 |
| 5,615,350 A | * | 3/1997 | Hesson et al. .............. 712/218 |
| RE36,462 E | | 12/1999 | Chang et al. |
| 6,430,670 B1 | * | 8/2002 | Bryg et al. .................. 711/216 |
| 6,438,673 B1 | * | 8/2002 | Jourdan et al. ............. 711/213 |
| 2001/0042189 A1 | * | 11/2001 | Babaian et al. ................ 712/23 |

OTHER PUBLICATIONS

Bershad, Brian et al. "Fast Mutual Exclusion for Uniprocessors", ACM Sigplan Notices: vol. 27, Issue 9 (Sep. 1992).

* cited by examiner

Primary Examiner—Henry W. H. Tsai
(74) Attorney, Agent, or Firm—Barry W. Chapin, Esq.; Chapin & Huang, LLC

(57) ABSTRACT

Mechanisms and techniques operate in a computerized device to enable or disable speculative execution of instructions such as reordering of load and store instructions a multiprocessing computerized device. The mechanisms and techniques provide a speculative execution controller that can detect a multiaccess memory condition between the first and second processors, such as concurrent access to shared data pages via page table entries. This can be done by monitoring page table entry accesses by other processors. The speculative execution controller sets a value of a speculation indicator in the memory system based on the multiaccess memory condition. If the value of the speculation indicator indicates that speculative execution of instructions is allowed in the computerized device, the speculative execution controller allows speculative execution of instructions in at least one of the first and second processors in the computerized device. If the value of the speculation indicator indicates that speculative execution of instructions is not allowed in the computerized device, the speculative execution controller does not allow speculative execution of instructions.

32 Claims, 5 Drawing Sheets

METHODS AND APPARATUS FOR CONTROLLING SPECULATIVE EXECUTION OF INSTRUCTIONS BASED ON A MULTIACCESS MEMORY CONDITION

CLAIM TO BENEFIT OF FILING DATE OF CO-PENDING PATENT APPLICATION

This application for patent is a Continuation-in-Part of, and hereby claims the benefit of the filing date of, the following former filed and co-pending U.S. patent application:

Title: "Methods And Apparatus For Controlling Speculative Execution of Instructions"

Ser. No. 09/924,891

Inventor: David Dice

Filing Date: Aug. 8, 2001

This referenced former filed U.S. application for patent is assigned to the same Assignee as the present application for patent. The entire teachings, disclosure and contents of this referenced application for patent are hereby incorporated by reference herein in their entirety.

FIELD OF THE INVENTION

The present invention generally relates to systems for executing instructions in a central processing unit within a computerized device, and more particularly, to mechanisms and techniques that control operation of speculatively executing instructions.

BACKGROUND OF THE INVENTION

Conventional computerized devices include a processor (e.g., microprocessor) or other circuitry that is capable of executing machine language instructions stored in a memory system operating within the computerized device. A collection of such machine language instructions or code in the memory system can form a computer program or software application. A software developer may use a text editor to write the computer program in a low-level language such as assembly language. The software developer can then processes the assembly language with a program called an assembler to convert the assembly language instructions into machine language instructions that the processor can natively execute. Alternatively, a software developer can write a software application using a high-level language such as C or C++ and can operate a program called a compiler which reads the C or C++ code and which automatically generates assembly level instructions which the compiler (or another program such as a linker) then assembles into machine language instructions that the processor can execute. Assembly language statements or instructions and their machine language counterparts thus represent the lowest level of programming that a software developer or a compiler can create that can then be executed by a processor in a computerized device.

Some compilers are equipped with a capability of producing optimized code. As an example, depending upon the target processor for which a compiler is generating code, the compiler may reorder certain instructions in the code such that when the target processor executes such re-ordered instructions, the target processor will execute them somewhat faster than if they had not been reordered due to the optimization feature of the compiler. Optimizing compilers thus attempt to arrange instructions in a more optimal manner for the faster execution on the target processor. Optimization processing may determine that certain instructions should be placed ahead of others, even though the original high-level software code might have indicated a different order for the high-level instructions that map or correspond to the re-ordered low level machine instructions.

As an example or how an optimization procedure might reorder instructions, consider the following fragment of C code:

*ptr1=a;
b=*ptr2;

The first statement "*ptr1=a" indicates that the value of variable "a" should be stored at a memory location identified by pointer 1 (*ptr1). The second statement "b=*ptr2" indicates that a value of variable "b" should be set to the contents of memory loaded from a memory location referenced by pointer 2 (*ptr2). For one type of microprocessor, a compiler might compile the aforementioned fragment of C code into the following assembly language or machine language equivalent set of instructions:

store R1->[R2]
load [R3]->R4.

Upon execution by the target processor, the "store" instruction causes the target processor to place the contents of register R1 (i.e., containing the value of variable "a") into a memory location defined in register R2. In other words, the store instruction causes the target processor to write a value to memory. The "load" instruction causes the target processor to obtain data from memory at the location defined in register R3 and to place this data into register R4 (which represents the "B" variable). That is, the load statement causes the target processor to read a value from memory.

Due to the nature of how instructions are executed in certain target processors, it might be preferable (i.e., faster) for the target processor to begin execution processing of a load instruction prior to a store instruction which appears before a load instruction in the code. This may be the case, perhaps, because the target processor requires more processing cycles to completely execute a load instruction whereas a store instruction might take fewer cycles to execute. Another reason to perform a load before a store might be that internal processor resources used by the load instruction, such as a memory channel, might be available before the store instruction but might not be available immediately after the store instruction. Accordingly, if the target processor can begin execution of the load instruction first, followed by the store instruction, the net result might be that both instructions are executed in a shorter total amount of time as compared to if these instructions had been executed in the original order shown above.

Some optimizing compilers are aware of this fact and may thus automatically reorder the instructions during compiling of the high-level language source code such that the load instruction precedes the store instruction in the machine language code. In other cases, a compiler may be unaware of efficiencies gained from reordering such instructions and the processor itself may reorder the instructions during its instruction execution procedure (i.e., during runtime). In such cases, as the processor encounters a store instruction followed by a load instruction, the processor may be configured to reorder the instructions so that the processor always execute the load before the store regardless of the order in which the compiler originally arranged the instructions.

In either instance, where either the compiler or the processor reorders load and store instructions, certain problems may arise.

Referring to the example store and load code shown above, suppose that R2 and R3 happen to refer to the same memory address. In such cases, moving the load prior to the store instruction will result in the store instruction fetching an incorrect value. This problem is called a read-after-write (RAW) hazard. Certain optimizing compilers that are capable of reordering load and store instructions can attempt to perform an alias analysis technique on the code in an attempt to determine, at compile time, if R2 and R3 are disjoint or distinct from each other (i.e., that a read-after-write hazard does not exist). In some cases, the alias analysis technique used by such compilers can break down and cannot guarantee that R2 and R3 are disjoint. When alias analysis fails, for reasons of safety and correctness, the compiler must be conservative and forgo reordering the load and store instructions.

Alternatively, some compilers are equipped to produce code that performs an explicit check at runtime to determine if R2 and R3 are disjoint. During runtime, if such explicit checking code determines that the R2 and R3 memory references are unique (i.e., are distinct), then the code follows an execution path in which the load instruction is executed prior to the store instruction (i.e., the load and store are reordered to improve execution speed). If the explicit check code determines that memory references associated with R2 and R3 are possibly related to one another, then the code marks one of the memory references as "volatile" and the processor is not permitted to execute the load instruction prior to the store instruction when this volatile memory reference is used in such instructions.

If a conventional processor performs reordering of load and store instructions during runtime execution of code in order to increase performance, the processor can include circuitry that can check for read-after-write hazards within itself after reordering and executing the reordered load and store instructions. In other words, the processor can "speculatively" execute load instructions before store instructions and can then perform a read-after-write hazard check after the fact to determine if the load store processing occurred without memory reference errors. If the processor determines that a read-after-write hazard did occur, the processor can reset its state to a state that existed just before the reorder operation and can then re-execute that portion of speculatively executed code in the original order by first executing the store instruction followed by the load instruction. As an example, upon detecting a read-after-write hazard, the processor can re-execute the offending instructions in program order (i.e., in the order in which they appear in the program), or the processor can discard a speculative state associated with the load instruction and can reissue the load instruction for execution along with any instructions that were dependent upon the load.

When a processor reorders a load instruction to execute prior to a store instruction and then performs read-after-write hazard checking, this processing is not visible to the executing program. In other words, from the programmer's perspective, the processor appears to have executed the instruction in program order as produced by the complier. Processor designers have determined that in most cases a load instruction can be reordered to execute before a store instruction without incurring a read-after-write hazard. As such, conventional wisdom is that computer systems obtain better execution performance by having processors perform such reorder operations while only occasionally incurring the performance penalty of having to undo and re-execute the instructions in the original order.

The aforementioned load and store reordering techniques may be used in conventional "uniaccess" execution environments comprising a single processor, or in which a computerized device includes multiple processors that processes that do not access regions of memory related to one another. Uniaccess execution environments may also include multiprocessor computer systems in which different threads of a process are constrained or bound to a single processor or in which different processes that share memory are constrained to execute on the same processor. Such example configurations are referred to herein as "uniaccess" execution environments.

Other conventional computerized devices can include multiple concurrently operating processors. In a "multiaccess" execution environment, different software processes may concurrently execute on different processors, or a single multi-threaded process may execute by having different threads concurrently execute on different processors (e.g., in a multiprocessor equipped computer system). A multiaccess execution environment can include memory such as shared memory or other memory that is potentially accessible by the different threads of the multi-threaded process or by different concurrently and/or simultaneously operating processes. In other words, a multiaccess execution environment is one in which the same memory location may potentially be accessed by two different portions of processing code (e.g., threads or processes). Multiaccess execution environments thus afford the ability to allow simultaneous (e.g., in multiprocessor computer systems) access to the same region of memory by different threads or processes. Two processes or threads might require access to the same memory area, for example, to allow such processes or threads to synchronize or exchange state with each other or for other reasons.

One conventional synchronization scheme is known as Dekker's Algorithm and begins operation in a process by using a store instruction followed by a load instruction. As discussed above, if a conventional compiler or one of the processors operating such a process or thread attempts to optimize execution of the Dekker's Algorithm store/load code by reordering the load instruction to execute before the store instruction, the algorithm can fail to maintain synchronization between processes or threads in a proper manner. In multiaccess execution environments then, a more complicated version of the read-after-write hazard can exist in which two different processes may contain store and load instructions that reference a common memory location (i.e., that are non-disjoint) and thus reordering in such cases should not be allowed in either processor. The problem discussed above is thus how to be able to reorder and execute load instructions before store instructions to gain the performance benefit while still being able to detect memory references between multiple processes that can cause hazards.

Some conventional processors, such as Intel's 32-bit Pentium line of microprocessors (manufactured by Intel Corporation, Pentium being a registered trademark of Intel Corporation), solve this problem by providing a structure (e.g., circuitry) called a memory order buffer or MOB. The memory order buffer operates in a processor to track or "snoop for" write accesses to shared memory locations performed by other processors, for any shared memory addresses that the processor (i.e., the processor operating the memory order buffer) has previously speculatively read. If the processor using the memory order buffer detects any of such writes from other processors to previously speculatively read memory addresses, the processor is said to have detected a "memory ordering violation." To overcome this violation, the processor can use the memory order buffer to cancel or restart the affected reads as well as all speculative actions that might have depended on those reads. Like the read-after-write recover circuitry discussed above (i.e., for uniaccess execution environments), the operation of the memory order buffer is inaccessible to a programmers and is thus invisible to the executing program's operation.

Other conventional processors such as Intel's 64-bit IA-64 line of microprocessors, of which the Itanium is a member, provide another structure called an Advanced Load Address Table (ALAT) that permits a compiler to explicitly "move up" or advance loads before other instructions (e.g., before stores) to permit the loads to execute earlier than would otherwise be possible. The ALAT is visible to the programmer and to the executing program. As such, the compiler must explicitly reorder the load instruction before the store instruction, as the processor containing the ALAT will not do so on its own. Since the compiler reorders these instructions for a target processor containing an ALAT, the compiler also produces special "check code" that is inserted into the code after reordering the load and store instructions. The purpose of the check code is to consult the ALAT to make sure that a value returned by an "advanced" (i.e., reordered) load instruction is still coherent. If the check code detects a memory violation, the code branches to a recover operation in order to correct the memory violation problem. The ALAT mechanism is also responsible for performing the read-after-write hazard checking discussed above.

Another conventional technology related to the present invention concerns the way in which processors in a computerized device access memory in order to read or write information (i.e., load or store data) to the memory. In many computer systems, a memory system such as random access memory (RAM) is logically divided into a set or series of pages of a predetermined size. A processor such as a central processing unit, microprocessor or other circuitry operating in such a conventional computer system includes a memory management unit or memory management unit that managed these pages. The memory management unit controls or governs access to pages of memory on behalf of program code being executed within a processor. Generally, when a processor causes the computer system to load program code and data into memory in order to begin execution of such code, the memory management unit allocates a number of pages of memory to the program (i.e., to store the program code and any data related to the program). The memory management unit may store the program code and data in pages of memory that span a wide range of physical memory addresses. However, the program code itself may contain instructions that reference the data associated with that program code over a set of logical memory addresses. Accordingly, typical conventional computer systems also include a page table that contains a series of page table entries. Each page table entry provides a mapping between a set of logical addresses to a set of physical addresses for each page of memory. A conventional memory management unit associated with a processor is generally responsible for maintaining the contents of the page table entries in the page table on behalf of programs executing on the processor associated with that memory management unit. In other words, when a processor loads and begins execution of program code that references data stored in memory at various logical addresses (addresses relative to that program), the memory management unit and operating system for that processor establishes and maintains page table entries that identify which pages of physical memory contain the physical addresses (and hence the actual code or data) that map to the logical addresses referenced by the program code.

A page table containing all page table entries can become quite large in a computer system since one or more processors can concurrently execute many different programs. This fact, in combination with the fact that a memory management unit operating within a processor must access page table entries in the page table stored in physical memory using a shared interconnection mechanism such as a data bus that can consume valuable processing time, has caused computing system developers to create a processor-internal page table entry buffer or cache called a "translation lookaside buffer" or translation lookaside buffer. An memory management unit can utilize the high-speed access characteristics of a processor-internal translation lookaside buffer containing recently accessed page table entries to increase program code execution speed.

A typical conventional translation lookaside buffer might contain between 16 to 64 page table entries that map recently used logical addresses (i.e., addresses used by a program executing in that processor) to relative physical memory addresses or pages. The set of physical pages mapped by an memory management unit in its associated translation lookaside buffer, which are thus readily accessible to the processor associated with that memory management unit, is called the translation lookaside buffer span. The translation lookaside buffer span is thus a small subset of the entire amount of memory address space accessible to a processor. When a program executes on a processor and references an instruction or data contained within a page of memory mapped by a page table entry that is not in the translation lookaside buffer, the memory management unit fetches the required page table entry from the page table resident in memory through a conventional data caching access technique that allows a processor to more rapidly access memory (via a data cache). In other words, to increase access to memory, conventional processors using memory cache techniques that provide processor-resident memory caches. A memory management unit in a processor performs accesses to page table entries for insertion into its translation lookaside buffer using the same techniques as other memory accesses (i.e., using caching).

In yet another conventional technology that is related to the present invention, in multiprocessor computer systems, each independently operating processor (e.g., each CPU or microprocessor) can maintain its own processor-resident memory cache. The memory cache provides a processor with high-speed access to data within the cache, as compared to having to access the required data from main memory over a bus. The cache also reduces bus traffic, and thus improves overall system throughput. Since multiprocessing computing system environments can allow processors to share data, computing system developers have created cache coherency protocols that ensure that the contents of processor-local caches and their corresponding main memory locations are properly maintained or synchronized if, for example, two caches maintained in respective separate processors contain references to a common or shared memory location.

One example of a conventional cache coherency protocol is the MESI cache coherence protocol, where "MESI" stands for Modified, Exclusive, Shared and Invalid. These terms represent the possible states of a processor cache line in a cache. MESI protocols, and others like it, are generally considered "snooping" protocols that maintain coherency for cache entries between all processors "attached" to a memory subsystem by snooping or monitoring the memory transactions of other processors. In doing so, if a first processor operates a MESI protocol to "snoop" a memory transaction of another processor and detects that this transaction reflects a change to a memory location associated with an entry in the first processor's cache, the first processor can appropriately update its cache entry based on the modified memory location to ensure that is cache accurately reflects the contents of the associated memory location (i.e., to maintain cache coherency).

SUMMARY OF THE INVENTION

Conventional techniques and mechanisms employed in processors and compilers to control speculative reordering and execution of instructions (i.e., speculation) suffer from a number of deficiencies.

In particular, for processors that use implicit and automatic speculation, the programmer has no control over when a processor performs speculation. As a result, the processor speculatively reorders and executes all instructions such as loads and stores that can be speculatively executed, even in situations where a read-after-write hazard or other memory violation occurs. When such hazards occur, the processor must then, after the fact, consume resources such as processing cycles and memory bandwidth to recover from the read-after-write hazard or memory reference violation (e.g., via the use of a memory order buffer). This overhead can reduce program execution performance when, for example, a programmer intentionally writes code (e.g., assembly language) that includes a store instruction followed by a load instruction and desires that the instructions be executed in that specific order. Perhaps the instructions reference a common memory location and the programmer intends this to be the case. However, even though the programmer explicitly writes the code with the intention that the store is to be executed prior to the load, conventional processors that employ implicit and automatic speculation will reorder the instructions nonetheless which results in the occurrence of a hazard and incurs the performance loss of having to recover from this hazard.

Another disadvantage of conventional processors is that the memory order buffer used to recover from memory access or other memory order violations is an expensive processor resource. When the processor must use the memory order buffer to recover from such a violation, the memory order buffer processing can significantly slow down the execution of a program. In addition, a memory order buffer is a complex structure that consumes processor die area (e.g., processor real estate), requires additional power, introduces design constraints on the processor, and can introduce unneeded latency into the speed of the processor. In addition, in some conventional processor designs, a memory order buffer is included in a uniprocessor design (i.e., on a processor dedicated for use in a uniaccess environment) even when the memory order buffer is not needed in such a processor.

In IA-64 processor architectures that provide an Advanced Load Address Table, the compiler must explicitly provide speculative reordering of load and store instructions and must further provide extensive checking and recover code which is inserted into the code of the software application (in addition to the code generated to perform the operation of that application) in order to utilize the ALAT to handle hazard or memory order violations. In other words, the compiler assumes that the instructions can be reordered and generates code containing the reordered instructions in addition to the code required to back out of a hazard situation using the ALAT. In situations where no memory order violation has occurred, performing the check code consumes valuable processor resources.

The present invention provides an alternative arrangement for controlling speculative reordering and execution of instructions such as load and store instructions in multi-access execution environments. Embodiments of the invention provide automatic detection of a multiaccess memory condition to set the value of a speculation indicator that indicates whether or not speculative execution of instructions is or is not allowed in a processor operating in a computerized device. This can be done in many embodiments without software assistance. In one embodiment of the invention, the multiaccess memory condition is determined by monitoring page table entry access by processors in the computerized device. As an example, if two processors access the same page table entry for inclusion into each processors respective translation lookaside buffer, then a speculative execution controller configured according to one embodiment of the invention may be configured to set a speculation indicator associated with the page of memory that corresponds to that page table entry (or a speculation indicator associated with the page table entry itself and/or with the translation lookaside buffer entry) to not allow speculative execution of instructions either contained in that page, or that reference data contained in that page (e.g., load or store instructions that read or write to that page).

The co-pending patent application referenced above, to which this application claims the benefit of the filing date (U.S. Ser. No. 09/924,891) discusses a system that can use a software instruction that a programmer can incorporate into a software program to turn on or turn off a speculation bit or indicator in a processor control register or within a page table entry. As discussed in that invention, software, with prior knowledge (e.g., containing an explicit speculative execution control instruction), can inform a processor of potential multiaccess sharing hazards. Embodiments of this invention relate to that invention disclosure and provide mechanisms and techniques to automatically detect potential sharing of memory between processors executing code in a multiprocessor computerized device by monitoring or snooping the loads of page table entries into translation lookaside buffers when one or more of such processors (i.e., memory management units within the processors) perform such actions. No prior knowledge or software control is required for many embodiments of this invention. By determining what page table entries are accessed by a first processor (e.g., for entry into that first processor's translation lookaside buffer), a second processor can infer that the first processor is performing (e.g., executing) code that requires referencing the physical memory identified by the range of addresses within that page table entry. Accordingly, if the second processor is also executing code that contains a reference to the same memory locations, then that second processor's translation lookaside buffer will contain a page table entry equivalent to the page table entry accessed by the first processor. Accordingly, the second processor can infer that both processors have the potential to access data in an same address range and can thus disable speculative execution of instructions that reference memory related to or referenced by the page table entry. Embodiments of the invention allow processors to monitor or snoop page table entry loads or accesses using, for example, MESI-type cache coherency protocols.

Typical implementations of MESI or "snoop-based" cache coherency protocols are distributed such that there is no specific centralized controller for the protocol. In other words, a speculative execution controller configured according to some embodiments of the invention is implemented within each processor. Embodiments of the invention are not limited as such however, and a centralized speculative execution controller is contemplated as being within the scope of embodiments of this invention.

In particular, a speculative execution controller operating according to an embodiment of the invention that detects a match between an MESI detected access to a page table entry of a first processor and an existing translation lookaside buffer entry of another (e.g., a second processor in which the speculative execution controller operates) has thus detected a multiaccess memory condition that indicates that speculative execution of instructions related to that page (i.e., contained in the page of memory or that reference data therein) is to be disabled or not allowed. To enforce this condition, the speculative execution controller of embodiments of this invention can set a speculation indicator in the matching page table entry in memory to indicate that speculative execution of instructions is not allowed for this page. The speculative execution controller can also set a speculation indicator in the corresponding translation lookaside buffer entry of the processor to which it is associated, or, in embodiments in which the speculative execution controller operates independently or in a distributed manner between each processor, the speculative execution controller can set the speculative indicator in each matching translation lookaside buffer entry in each processor.

In another embodiment of the invention, once the speculative execution controller detects a multiaccess memory condition indicating that the translation lookaside buffer spans of two or more processors overlap, the speculative execution controller can set a speculation indicator of the corresponding page table entry in main memory and can rely on the operation of a cache coherency protocol such as an MESI protocol to detect the change to that main memory location and to propagate this change to the cache contents of each processor that references this memory location. This has the effect of updating the matching translation lookaside buffer entries in each processor to contain a speculation indicator that indicates that speculative execution of instructions is not allowed for instructions that related to or reference the page of memory corresponding to that translation lookaside buffer entry.

Embodiments of the invention thus provide techniques and mechanisms for controlling speculative execution of instructions in a computerized device. In particular, one embodiment provides a method for controlling speculative execution of instructions in a computerized device by performing the steps of detecting a multiaccess memory condition and setting a value of a speculation indicator based on the multiaccess memory condition. The step of detecting a multiaccess memory condition in some embodiments of the invention includes detecting when at least two processors in the computerized device have a potential to concurrently or simultaneously execute instructions that reference locations within a shared page of memory. In other embodiments, this step identifies when a translation lookaside buffer span associated with a first processor overlaps a translation lookaside buffer span associated with one or more second processors. In one embodiment, the step of setting that value of the speculation indicator includes setting the value of the speculation indicator to indicate that speculative execution of instructions is not allowed for portions of the translation lookaside buffer that overlap with one another. If the value of the speculation indicator indicates that speculative execution of instructions is allowed in the computerized device, the method allows speculative execution of instructions in a processor in the computerized device. If the value of the speculation indicator indicates that speculative execution of instructions is not allowed in the computerized device, the method does not allow speculative execution of instructions in the processor in the computerized device.

In another embodiment of the invention, the step of detecting a multiaccess memory condition comprises the steps of identifying a potential of a first processor to access a memory location and identifying a potential of a second processor to access the memory location. As an example, a cache coherency protocol can detect accesses such as loads to page table entries by processors. In response to the steps of identifying, the step of setting a value of a speculation indicator comprises the step of setting the value of the speculation indicator to indicate that speculative execution of instructions one or both of the first and second processors is not allowed in the computerized device for instructions that reference the memory location (i.e., are contained within, or that reference data or other information, flags, bits, etc. contained with that memory location or page).

To identify potentials of a first and/or second processor to access the same memory location (e.g., the same page), one embodiment comprises the steps of detecting an access, by the first processor, to a page table entry of a page table associated with the first processor. The page table entry contains an association to the memory location, such as a physical memory location. The method also includes the step of retrieving the access to the page table entry. Also in this embodiment, to identify the potential of a second processor to access the memory location, the method compares the content of the access to the page table entry of the first processor to a set of page table entries associated with the second processor (e.g., in a translation lookaside buffer of the second processor) to identify a page table entry associated with the second processor that references the memory location associated with the access to the page table entry by the first processor.

Other embodiments of the invention comprise the steps of determining when at least two processors in the computerized device do not have a potential to execute instructions that reference locations within a shared page of memory. In response to the step of determining, the step of setting a value of a speculation indicator comprises the step of setting the value of the speculation indicator to indicate that speculative execution of instructions is allowed in the computerized device.

Embodiments of the invention can be implemented within circuitry within each processor in a multiprocessor computerized device or, alternatively, other circuitry (i.e., independent of the processors themselves) in such a computerized device can implement the mechanisms and techniques explained herein. Alternatively, in computer systems that allow software access to translation lookaside buffers, embodiments of the invention can be implemented within software to operate as explained herein. Once embodiments of the invention have operated to properly set a speculation indicator to indicate whether or not speculative execution of instructions is allowed for particular processor in a computerized device, the mechanisms and techniques disclosed in the aforementioned co-pending application for patent (U.S. Ser. No. 09/924,891) to which this present invention claims the benefit of the filing date can be employed in order to allow or not allow the processor to speculatively executed structures.

Other embodiments of the invention include a computerized device, workstation, handheld or laptop computer, or the like configured with software and/or circuitry (e.g., a speculative execution controller as explained herein) to process any or all of the method operations disclosed herein as embodiments of the invention. In other words, a computerized device or a processor that is programmed or configured to operate as explained herein is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and one or more processors, programs the processor(s) to perform the operations disclosed herein as embodiment of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed into a computerized device to cause the computerized device to perform the techniques explained herein as embodiments of the invention.

It is to be understood that the system of the invention can be embodied strictly as a software program, as software and hardware, or as circuitry in a processor or other hardware alone. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
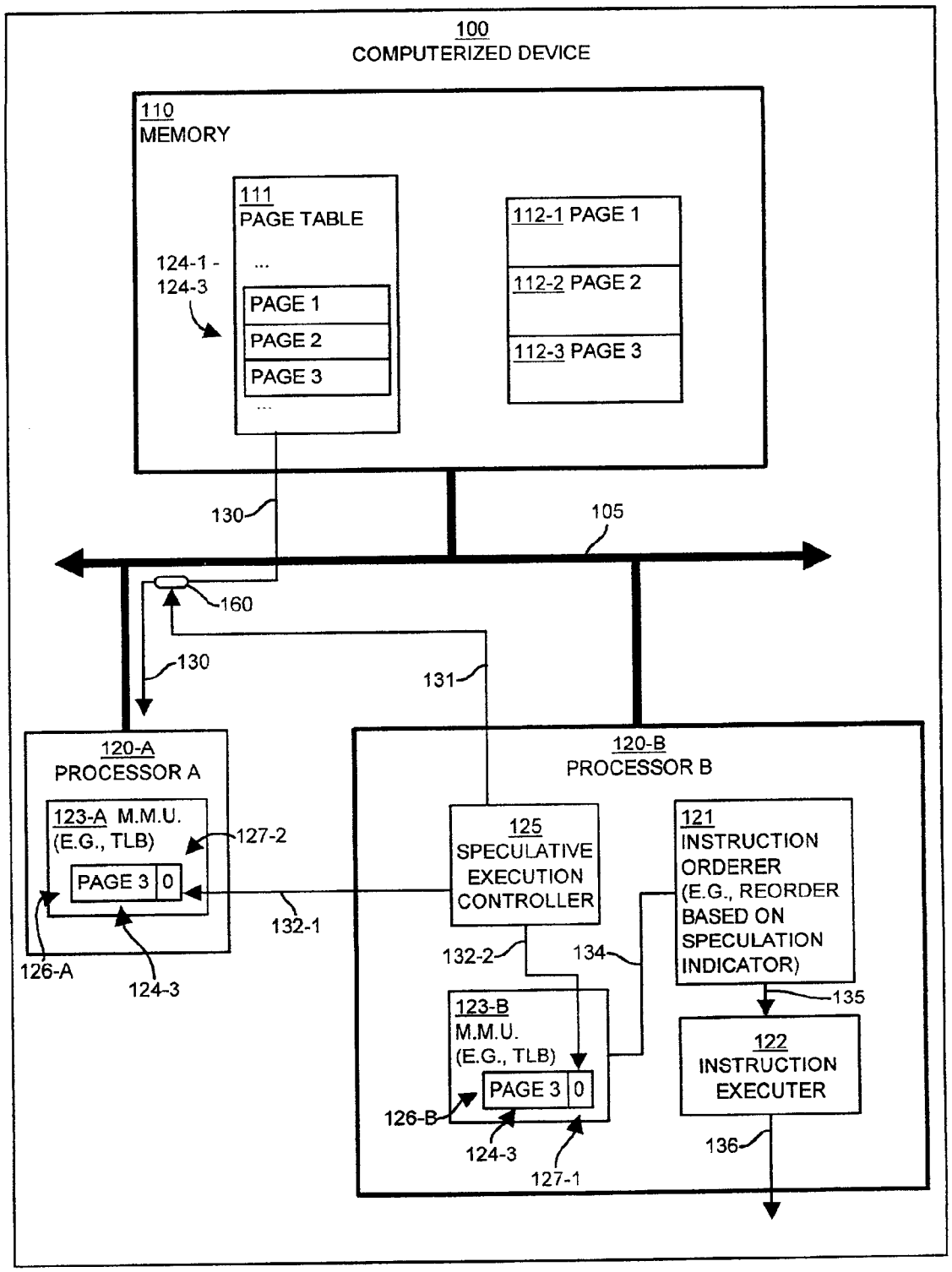
FIG. 1 illustrates an example architecture of the computerized device configured in accordance with one embodiment of the invention.

Embodiments of the invention provide mechanisms and techniques for controlling speculative reordering and execution of instructions, such as load and store instructions, in a computerized device. Embodiments of the invention provide a speculative execution controller that is capable of controlling speculative execution of instructions in the processor by allowing or not allowing the processor to speculatively reorder and execute instruction sequences depending upon the value or setting (i.e., on or off, true of false, 1 or 0, or another value) of a speculation indicator set by the speculative execution controller. If the speculation indicator is enabled, is set, or is otherwise in an "on" or "1" or true or first state, the speculative execution controller allows the processor to speculatively execute instructions. Conversely, if the speculation indicator is disabled, is unset, or is otherwise in an "off" or "0" or false or second state, the speculative execution controller does not allow a processor to speculatively execute instructions.

Embodiments of the invention operate in a multiprocessing computer system in which two or more processors can concurrently execute program or other code or instructions. The speculative execution controller sets the value of the speculation indicator based upon a multiaccess memory condition existing between the two or more processors. As an example, embodiments of the invention can detect a multiaccess memory condition by identifying a potential for two or more processors (e.g., a first and second processor) to be able to concurrently access a common memory location (e.g., the same physical location, or two "close" locations from the same range of physical locations such as the same page). In such cases, embodiments of the invention can set the value of a speculation indicator associated with that memory location (e.g., with a page or other unit of memory) to indicate that speculative execution of instructions by the first and/or second processor (or others if such processors also reference that memory location) is not allowed (i.e., is disabled) for instructions that reference or that relate to that common memory location.

In one embodiment, to detect a multiaccess memory condition, embodiments of the invention can monitor page table entry accesses performed by processors in the computerized device (e.g., by memory management units in such processors). By way of example, consider a computerized device having first and second processors which collectively operate as a multiprocessing computing system environment that allows concurrent execution of code on each processor at the same time. Each processor may be configured with a speculative execution controller configured according to one embodiment of the invention. The speculative execution controllers can reside as components (i.e., as circuitry) within each processor. One speculative execution controller can detect an access, by a first processor, to a page table entry of a page table associated with the first processor and can retrieve the access to the page table entry. To do so, in one example, the speculative execution controller can utilize a MESI cache coherency protocol to snoop a memory bus coupling the processors and a memory system in order to detect accesses to (e.g., loads of) page table entries which the first processor performs to update its translation lookaside buffer entries.

The second processor which detects and monitors (e.g., obtains access to the contents of) the first processor's access to the page table entry can compare the content or address of that access to a set of page table entries associated with the second processor (e.g., in a translation lookaside buffer associated with second processor) in order to identify any page table entry(s) associated with the second processor (e.g., in the translation lookaside buffer in the second processor) that reference memory locations associated with the detected access to the page table entry made by the first processor. In other words, when one processor accesses page table entries from a memory (e.g., destined for the translation lookaside buffer for that processor), the other processor can detect such memory accesses (e.g., via an MESI-like protocol) and can compare the contents of that page table entry access to page table entries in its translation lookaside buffer to see if the translation lookaside buffer spans of each processor overlap.

By "compare the contents," embodiments of the invention can, in some embodiments, perform either "value" (i.e., content) based page table entry comparisons, or can perform "address" based comparisons to determine when translation lookaside buffer spans overlap. Certain implementation details related to value-based and address-based techniques for maintaining a speculation indicator are discussed below with respect to the Figures.

Generally however, for any overlapping translation lookaside buffer entries, the speculative execution controller can set a speculation indicator associated with the matching page table entry(s) to indicate that speculative execution of instructions is not allowed for instructions executed by that processor (or by both processors) that reference memory locations (e.g., page addresses) referenced by that page table entry. Depending upon which embodiment of the invention is in use, the speculative execution controller can set the speculation indicator either in memory itself in the computerized device, or in the translation lookaside buffer in one or both processors, or in both the translation lookaside buffer(s) and in memory.

Embodiments of the invention are thus able to identify when the translation lookaside buffer spans associated with two or more processors overlap. In response to such an identification, embodiments of the invention can set the value of a speculation indicator associated with any overlapping portions of each translation lookaside buffer span (e.g., associated with each TLB entry) to indicate that speculative execution of instructions is not allowed for instructions or data referenced by those instructions contained in memory related to the portions of the translation lookaside buffer that overlap with one another.

Once an embodiment of the invention has set a speculation indicator in a translation lookaside buffer entry (or in a page table entry in memory) to indicate that speculative execution of instructions is or is not allowed, embodiments of the invention can utilize the mechanisms and techniques explained in the formerly referenced co-pending patent application in order to control speculative execution of instructions in the computerized device on a per processor basis.

FIG. 1 illustrates an example computerized device 100 configured according to one embodiment of the invention that is suitable for use in explaining how one embodiment of the invention can control speculative execution of instructions in a computerized device 100. The computerized device includes an interconnection mechanism 105 such as a data bus and/or related circuitry which interconnects a memory system 110 to a first processor 120-A (PROCESSOR A) and a second processor 120-B (PROCESSOR B). The computerized device 100 in this and in other illustrations discussed herein can be any type of computerized device such as a computer system, workstation, dedicated computer device (e.g., handheld device, dedicated device, etc.) or any other type of electronic device that uses multiple processors to concurrently execute instructions contained within memory. The memory 110 may be any type of computer readable storage medium such as volatile or non-volatile electronic semiconductor memory (e.g., random access memory), programmable memory (e.g., erasable programmable memory) or any other type of storage media that can maintain information such as code and/or data in a computerized device. Each processor 120 can be any type of processing device or circuitry such as a central processing unit, microprocessor, application-specific integrated circuit (ASIC), programmable gate array device or circuit, state machine, or any other type of electronic circuitry that can be configured to perform, execute, run, interpret or otherwise operate upon program logic instructions (e.g., programming code) and/or data contained within the memory 110.

Componentry relevant to the explanation of this embodiment of the invention is shown in FIG. 1 within processor 120-B, whereas componentry within processor 120-A is not illustrated in such detail for this example. In particular, processor 120-B includes an instruction orderer 121, an instruction executor 122, a memory management unit 123-B (e.g., containing a translation lookaside buffer having translation lookaside buffer entries 126, only one TLB entry 126-B shown in this example) and a speculative execution controller 125. Processor 120-A in this example includes a memory management unit 123-A. It is to be understood that each processor 120-A and 120-B can contain more componentry and circuitry than that which is shown in FIG. 1. FIG. 1 thus illustrates components required for the explanation of embodiments of the invention and is not intended to show a complete architecture of a processor. Assume for this example that processor 120-A contains similar componentry as processor 120-B.

The memory 110 is encoded with a page table 111 that includes a plurality of page table entries 124. In this example, three page table entries 124-1 through 124-3 are illustrated. Each page table entry 124 maps a range of virtual memory addresses to a range or page 112 of physical memory addresses. The virtual-to-physical memory address mappings of the page table entries 124-1 through 124-3 refer to the respective pages of memory 112-1 through 112-3.

In this example embodiment of the invention, each translation lookaside buffer entry 126 includes a respective page table entry 124 and a respective speculation indicator 127. In this example, the speculation indicators 127 are bits that can be set to either: a "1" to represent that speculative execution of instructions is allowed for instructions contained in, or that reference data existing within, the particular page of memory referenced by a page table entry 124 contained within that translation lookaside buffer entry 126; or, to a "0" to represent that speculative execution of instructions is not allowed for instructions contained in, or that reference data existing within that particular page 112 of memory referenced by that page table entry 124 within that translation lookaside buffer entry 126. In other words, the value of the speculation indicator 127 for a particular translation lookaside buffer entry 126 (i.e., by a page table entry 124 contained therein) indicates whether or not speculative execution is allowed for instructions or data contained within the memory address range or page 112 mapped by that page table entry 124.

According to embodiments of the invention, the speculative execution controller 125 is capable of identifying when pages of memory 112 have the potential to be concurrently referenced or shared by each of the processors 120-A and 120-B. In such cases, the speculative execution controller 125 configured according to embodiments of the invention sets the speculation indicator 127 for translation lookaside buffer entry 126 containing a respective page table entry 124 associated with the page 112 of memory 110 that has the potential to be referenced by each of the processors 120-a and 120-B to indicate that speculative execution of instructions is not allowed in a computerized device 100 for that page 112. In this manner, embodiments of the invention disable speculative execution of instructions, such as speculatively executing load instructions before store instructions, when pages 112 of memory are concurrently accessed or have the potential to be accessed by two or more processors 120 within the computerized device 100 as the same time.

Figure 2:
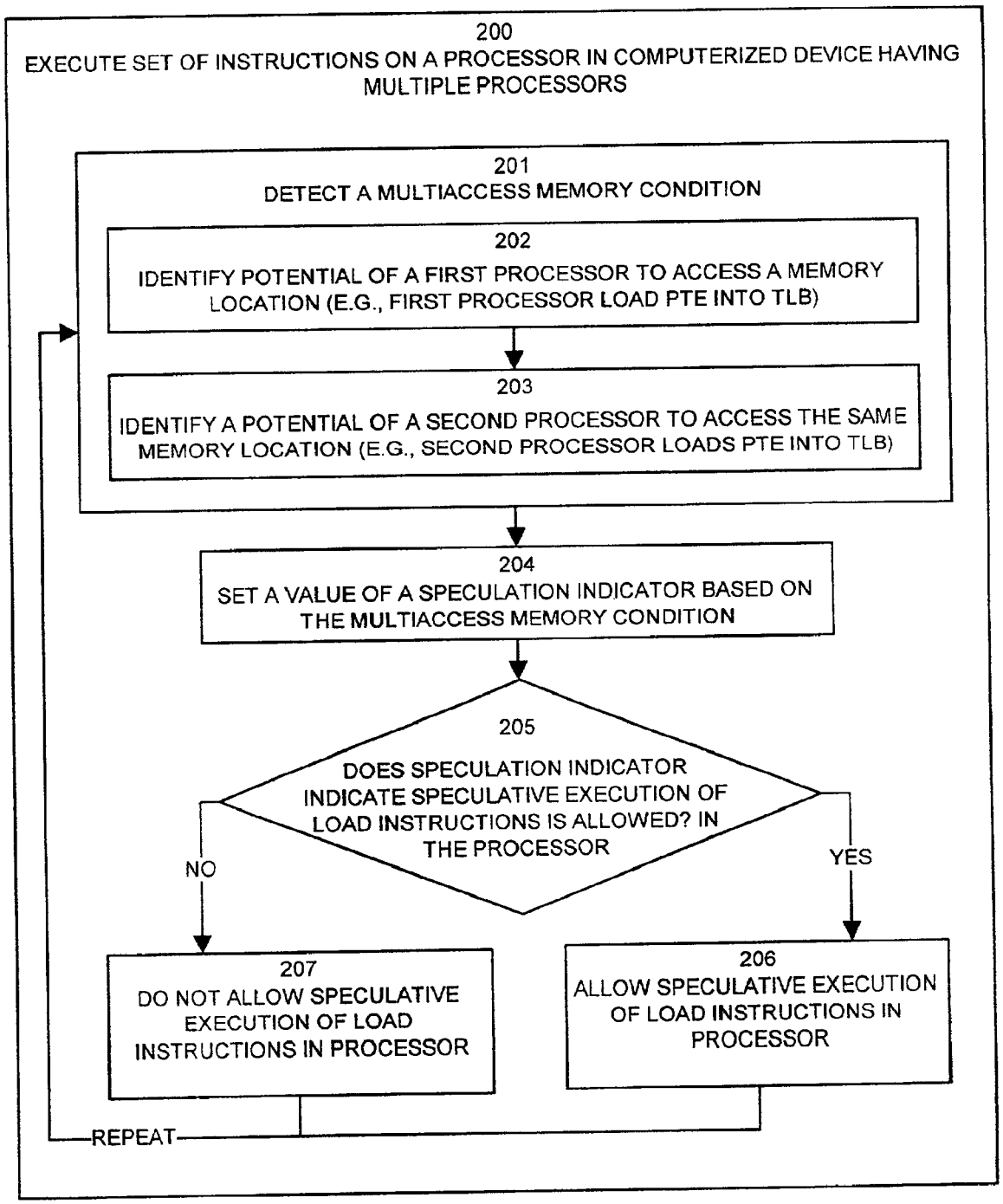
FIG. 2 is a flow chart of processing steps performed according to one embodiment of the invention to control an ability of a processor to speculatively execute instructions in a multiprocessing computerized device.

A brief summary of the operation of the example embodiment of FIG. 1 will be provided next followed by a more detailed explanation of processing steps provided with respect to FIG. 2.

According to the general operation of the example illustrated in FIG. 1, assume that processor 120-B accesses the page table entry 124-3 and thus the memory management unit 123-B places this page table entry 124-3 into the translation lookaside buffer as translation lookaside buffer entry 126-B. Prior to the other processor 120-A requiring access to this same page table entry 124-3, the processor 120-B can speculatively execute instructions for memory referenced by this page table entry 124-3 (i.e., memory contained within PAGE 3 112-3). At some point thereafter, the processor 120-A also loads 130 the contents 160 of the page table entry 124-3 into its translation lookaside buffer as TLB entry 126-A. As will be explained, the page table entry 124-3 might have been loaded from the same page table address in memory or it may have been loaded from a different page table address. In any event, the contents of the page table entry 124-3 references the same page of memory PAGE 3 112-3.

According to the operation of this example embodiment of the invention, at this point, the speculative execution controller 125, for example, using an MESI-like snooping protocol to snoop the interconnection mechanism 105 (i.e., the bus), detects the page table entry load 160 made by the processor 120-A and examines the contents or value of the page table entry 124-3 contained within the page table load 160. In other words, during the read operation 130 of the page table entry 124-3 made by the other processor 120-A, the speculative execution controller 125 operating within the processor 120-B "sees" the page table load 160 on the bus 105.

In response, the speculative execution controller 125 searches its set of translation lookaside buffer entries 126 within the memory management unit 123-B and discovers that entry 126-B contains a reference to the same page table entry 124-3. In other words, the speculative execution controller 125 detects a multiaccess memory condition that indicates the potential for both processors 120-A and 120-B to concurrently access the same memory location (i.e., a memory location within the range of addresses referenced by the page table entry 124-3). In response, the speculative execution controller 125 sets the speculation indicator 127 for each of the page table entries 124-3 in each of the translation lookaside buffer entries 126 for all processors that contain such an entry in order to disable speculative execution of instructions for memory related to that page table entry 124-3.

In one embodiment, the speculative execution controller 125 can simultaneously set 132-1, 132-2 the speculation indicator 127 for each matching translation lookaside buffer entry 126 within each processor 120, for example, by driving a speculation signal on the memory bus 105 to indicate to the other processor(s) (e.g., 120-A in this example) that the speculation indicator 127-2 associated with the translation lookaside buffer entry 126-A should be set in order to disable speculative execution of instructions for the page table entry 124-3. In this manner, the processor 120-B changes the state of translation lookaside buffer entries that refer to the same page table entry 124-3 in all processors 120 in the computerized device 100 to a state or value that indicates that speculative execution of instructions should not be allowed for instructions or data referenced within the page. In response, the processor 120-A detects the "share" signal on the bus 105 (i.e., enabled by the speculative execution controller 125 via the MESI-like protocol share signal) and changes the speculation indicator 127-2 for the newly loaded translation lookaside buffer entry 126-A (i.e., loaded with the page table entry 124-3) from a default state of speculation enable (i.e., "1") to a state indicating that speculative execution of instructions is not to be allowed (i.e., "0"). Accordingly, when the processor 120-A begins execution of instructions or references data related to the page 112-3 associated with the page table entry 124-3, speculative execution will not be allowed.

The former brief explanation described an example of the use of content or value-based page table entry access detection, as opposed to address-based detection. It is to be understood that the former explanation is an example only and is not intended to be limiting of embodiments of the invention.

Further details of the operation of another example embodiment of the invention illustrated in FIG. 1 will now be provided with respect to the flow chart of processing steps shown in FIG. 2.

FIG. 2 is a flow chart of processing steps performed by the second processor 120-B configured in accordance with one embodiment of the invention to control speculative execution of instructions in that processor 120-B while operating within the computerized device 100. During the description of the processing steps shown in FIG. 2, reference will be made to the example embodiment of the invention illustrated in FIG. 1. It is to be understood that the description of processing steps shown in FIG. 2 are described for this example with respect to operation of the speculative execution controller 125 only within processor B 120-B, but that in computerized devices 100 having similarly configured processors 120-A and 120-B, such processing steps can be performed by both processors 120-A and 120-B within the computerized device 100. For this description then, an embodiment of the invention will be explained which controls speculative execution within the processor 120-B. Is not required that the first processor 120-A be similarly configured, though a typical implementation uses similarly configured processors 120 (i.e., each containing the componentry illustrated in FIG. 1) such that each processor 120-A and 120-B is able to perform according to embodiments of the invention as explained herein in order to control speculative execution of instructions within itself based on access to page table entries that it detects are made by the other processor.

In step 200, the second processor 120-B begins executing a set of instructions in a computerized device 100 having multiple processors (e.g., the first processor 120-A and the second processor 120-B in the example in FIG. 1). As shown with respect to the illustration in FIG. 1, the instruction orderer 121 and instruction executor 123 are configured to perform ordering and execution of instructions as explained in the copending formerly referenced U.S. application for patent Ser. No. 09/924,891. The remaining steps 201 through 205 shown in FIG. 2 operate during the general process of executing instructions such as a software application being executed by the instruction orderer and instruction executor 121, 122 within the second processor 120-B.

In step 201, the processor 120-B detects a multiaccess memory condition (e.g., 160 in FIG. 1) within the computerized device 100. Generally, a multiaccess memory condition indicates whether or not two or more processors 120 operating within the computerized device 100 have the potential for accessing a common page 112 of memory 110.

Steps 202 and 203 described below illustrate one example technique according to one embodiment of the invention for detecting a multiaccess memory condition.

In step 202, the speculative execution controller 125 identifies a potential of the first processor 120-A to access a memory location (e.g., page 112-3—PAGE 3) within the memory 110. In one embodiment of the invention, this potential is identified as illustrated at location 131 in FIG. 1 by operating the speculative execution controller 125 in the second processor 120-B to utilize a cache coherency protocol (e.g., an MESI-like protocol) in order to snoop 131 accesses 160 to a page table entry(s) by the first processor 120-A. In other words, the speculative execution controller 125 is capable of snooping or monitoring accesses 160 by the first processor 120-A to page table entries 124 which occur over the interconnection mechanism 105, for example, via monitoring results of an MESI cache coherency protocol which, as explained above, insures that cache lines read by processors 120 operating with a multiprocessing computerized device 100 remain synchronized with each other. Since the memory management unit 123-A within the first processor 120-A utilizes a conventional cache access technique to obtain page table entries to be loaded into a translation lookaside buffer maintained within the memory management unit 123-A, a cache coherency protocol in operation 131 between the two processors 120-A and 120-B detects 131 all page table entry accesses 130 by the first processor 120-A from the page table 111 in the memory 110 since all memory transactions are snooped in such a manner by such a protocol.

In step 203, the speculative execution controller 125 identifies a potential of the second processor 120-B to access the same memory location. In particular, the memory management unit 123-B operating within the second processor 120-B may already contain the same page table entry 124-3 to the same page 112-3 of memory 110 within a translation lookaside buffer entry 126-B which corresponds to the page table entry 124-3 accessed 160 (flow 130 in FIG. 1) by the first processor 120-A and stored within a translation lookaside buffer entry 126-A in the processor 120-A, as detected by the cache coherency protocol 131. Accordingly, in steps 202 and 203, the speculative execution controller 125 is capable of identifying page table entries 124 that each processor 120-A and 120-B maintains within translation lookaside buffer entries 126 within the respective memory management units 123-A and 123-B of those processors 120-A and 120-B. Stated differently, the speculative execution controller 125 is capable of comparing a page table load of a page table entry by the first processor 120-A to determine if translation lookaside buffer entries in the second processor 120-B overlap. Such a comparison can be done to determine overlapping translation lookaside buffer spans, for example, using "value" or content-based comparisons or by address-based comparisons.

In value-based comparisons, a speculative execution controller 125 configured according to one embodiment of the invention can differentiate normal loads of data within memory by the first processor 120-A from page table entry loads (i.e., 130) based on the content of a page table load 160 made another processor. This can be done, for example, by having an operating system operating in the computerized device place page tables 111 (and hence page table entries) at certain known physical address ranges in memory 110. Such address ranges can be "known" to the speculative execution controller 125 operating in each processor 120. Thus, a speculative execution controller 125 using a MESI-like bus snooping protocol 131 can detect memory loads of other processors and can discriminate normal data loads from loads 130 of page table entries 160 by checking the snooped address of the load against a set of known page table entry addresses in memory 110. Alternatively, a processor performing a load of a page table entry can drive (e.g., set high or turn on) auxiliary bus status lines on the bus 105 to indicate to speculative execution controller(s) 125 in other processor(s) 120 that a specific memory load is a page table entry load 160 as opposed to a normal data load. The speculative execution controller(s) (i.e., 125) in the other processor(s) (i.e., 120-B in FIG. 1) can then observe or read the bus lines 105 during that special page table entry load 160 to obtain the address of the specific page table entry 124 loaded. The speculative execution controller 125 can then compare this value to the set of translation lookaside buffer entries 126 maintained by the memory management unit 123-B to determine if there are any overlapping translation lookaside buffer entries 124 that match the address of the load 160.

In an alternative embodiment, for address-based comparisons, a speculative execution controller 125 can associate cache coherency protocol "speculation state" as a speculation indicator 127 with each in-processor translation lookaside buffer entry 124. In other words, the speculation indicator 127 in this configuration can be a bit or other signal or flag associated with each translation lookaside buffer entry 124 (either in the TLB itself or in a cached version of the TLB in a cache maintained by the memory management unit 123 in the processor) in the processor. In such embodiments, translation lookaside buffer entries 126 must essentially participate in the MESI-like cache coherency protocol to ensure that speculation state 127 associated with a translation lookaside buffer entry 126 is properly maintained by the MESI-like protocol.

A MESI-like protocol can maintain such a speculation state indicator 127 in either the translation lookaside buffer entry 126 itself (e.g., as an extra bit 127 associated with each TLB entry 126), or in a cached version of the translation lookaside buffer entries that the processor always keeps in its cache (not specifically shown in FIG. 1). In this manner, a MESI-like cache coherency protocol automatically keeps track of which processors 120 are sharing a page table entry 124 since each keeps the translation lookaside buffers entries 126 in its cache (or the protocol can access the TLB itself) and the cache coherency protocol (i.e., 131) will set the speculation indicator 127 for a particular TLB entry 126 to be "shared" when two or more processors (e.g., 120-A and 120-B) access (i.e., load or have loaded) the same page table entry 124. In this manner, a processor 120 (e.g., an instruction orderer 121) can query the speculation indicator 127 of a page table entry 126 associated with a page to determine if speculation is allowed or not for that page.

For embodiments that use this address-based technique, all translation lookaside buffer entries that are to have an associated speculation state (i.e., maintained by the MESI-like protocol) must be "under watch" by the MESI-like protocol and thus must either be maintained in a processor's cache or the MESI-like protocol must be able to maintain a speculation indicator 127 as part of the translation lookaside buffer itself. If all of such TLB entries 126 are not "permanently" cached, then for those that are not cached, an instruction orderer 121 might not be able to accurately determine the value of a speculation indicator 127 of a translation lookaside buffer entry 126 (i.e., one that is not always cached) and can assume that speculative execution of instructions is not allowed for instructions that reference a page corresponding to such a non-cached translation lookaside buffer entry 126. For embodiments that use address-based snooping comparisons, page table entry address to physical page mappings must be one-to-one. As such, page aliasing or synonym techniques are not allowed. In other words, no two distinct page table entries 124 can map to the same physical page.

As a result of processing steps 202 and 203, a multiaccess memory condition (e.g., signal or indication) is produced that contains a value that indicates that there is a potential for each processor to access a common memory location (e.g., page 112-3) at the same time. If either step 202 or 203 does not identify a potential of both processors 120-A and 120-B to access the same memory location, a multiaccess memory condition is still produced in step 201, but it contains a value that does not indicate that there is a potential for both processors 120-A and 120-B to access the same memory location. In other words, the multiaccess memory condition can represent either that both processors have the potential to access the same memory location or that they do not have such a potential.

In step 204, the speculative execution controller 125 sets a value of a speculation indicator 127-1 based upon the multiaccess memory condition produced as a result of processing step 201. In this particular example as illustrated in FIG. 1, the speculative execution controller 125 sets a value of the speculation indicator 127-1 in the translation lookaside buffer entry 126-B to a value of "0" to indicate that speculative execution of instructions is not allowed for "PAGE 3" of the memory 110. The speculative execution controller 125, via use of the MESI protocol, also sets a value of the speculation indicator 127-2 in the translation lookaside buffer entry 126-A in the processor 120-A to a value of "0" as well. The speculation indicators 127 thus serves as a signal for the instruction orderer 121 as to whether or not to allow reordering of instructions, such as store and load instructions, from an order in which they originally existed, for speculative execution by the instruction executer 122 within the second processor 120-B. The speculation indicators 127 can be values represented by one or more bits within a page table entry 124 within a translation lookaside buffer entry 126 or as bits or flags or other data within the translation lookaside buffer entry 126-B.

Next, in step 205, the instruction orderer 121-B, during normal access to pages of memory 112 identified by translation lookaside buffer entries 126 containing page table entries 124 from the memory management unit 123-B, determines if the speculation indicator 127 (specifically 127-1 in FIG. 1) associated with that particular page table entry (i.e., translation lookaside buffer entry 126-B) indicates that speculative execution of instructions is allowed in the computerized device 100. In particular, the instruction orderer 121-B makes such a speculative execution determination based on the speculation indicator 127-1 for any instructions or data referenced by those instructions that exist within the page 112-3 identified by the translation lookaside buffer entry 126-B. In other words, during ordering of instructions for execution by the instruction executor 122-B, the instruction orderer 121-B may or may not reorder instructions for speculative execution based upon the value of the speculation indicator 127-1 associated with page table entries 124 in which those instructions reside or in which data referenced by those instructions resides. If, in step 205, the instruction orderer 121-B determines that a speculation indicator 127-1 associated with a translation lookaside buffer entry 126-B indicates speculative execution of instructions is allowed in the processor 120-B in which that instruction orderer 121-B operates, processing proceeds to step 206 to allow speculative execution of instructions in the processor 120-B for instructions related to that page.

In step 206, the instruction orderer 121-B is thus allowed to reorder instructions if such instructions lend themselves to being reordered, such as load and store instructions existing within program code.

Alternatively in step 205, if the instruction orderer 121-B determines that the speculation indicator 127-1 does not indicate that speculative execution of instructions is allowed in the processor, processing proceeds to step 207.

In step 207, the instruction orderer 121-B does not allow speculative execution of instructions in the processor 120-B and thus will not reorder instructions such as load and store instructions existing within program code related to page table entries (i.e., referencing data therein, or containing instructions therein) that have their associated speculation indicators 127 set to "0" when such code is executed (or when such data is otherwise referenced) on the processor 120-B.

After the processor 120-B performs either step 206 or step 207, execution of instructions continues by returning to step 200 and the processing steps 201 through 207 are repeated upon the next occurrence of a multiaccess memory condition (e.g., upon detecting another access to a page table entry by the first processor 120-A).

According to the foregoing description, the speculative execution controller 125 makes the decision of whether to allow or not allow the instruction orderer 121 to speculatively execute instructions based upon the value of snooped page table entry accesses 160 made by other processors 120 operating within the computerized device 100 and by comparing these values to existing translation lookaside buffer entries 126 in the processor 120-B.

In this example embodiment of the invention, a cache coherency protocol 132 operating between the first and second processors 120-A and 120-B (e.g., operating in the memory management units 123-A and 123-B) can be used to maintain coherency between the the speculation indicators 127-1 and 127-2. That is, the cache coherency protocol under operation by the speculative execution controller 125 can automatically update the speculation indicator 127-2 in the translation lookaside buffer cache in the memory management unit 123-A in the first processor 120-A to change its value from "1" to "0", thus also disallowing speculative execution in the first processor 120-A for the same page of memory. In another embodiment, a cache of memory locations maintained by each memory management unit 123 in each processor 120 can be forced to keep translation lookaside buffer entries 126 resident (e.g., sticky) at all times. In this manner, since the cache in each processor 120 always contains the translation lookaside buffer entries 126 and hence also contains the speculation indicators 127 upon which the instruction orderer 121 in such processors bases its speculation execution decisions, if any changes are made to speculation indicators 127, a cache coherency protocol operating in each processor 120 will "immediately" pickup the change to the speculation indicator for that translation lookaside buffer entry and reflect this change in the translation lookaside buffer for each other processor that also contains the same entry.

In an alternative configuration, the first processor 120-A need not update the value of the speculation indicator 127-1. In such an embodiment, the second processor 120-B will not be allowed to speculatively execute instructions that relate to PAGE 3 (due to the processing of FIG. 2 explained above), but the first processor 120-A will still be able to speculatively execute such instructions. This might allow the first processor 120-A to execute such instructions somewhat faster than the second processor, due to efficiencies gained by speculative execution. However, a hazard situation might exist in such situations in which the first processor 120-A allows speculative execution while the second processor 120-B does not, thus opening the potential for hazard conditions to exist. In addition, it is difficult to write algorithms to tolerate a condition in which one or more processors can speculatively execute instructions, while others cannot do so. Generally then, this embodiment is explained here for completeness but in most cases, is may be preferable to have all processor in a computerized device be synchronized such that speculation indicators 127 for the same page table entry accessed by two or more processors each indicate that speculative execution is not allowed for those processors.

Figure 3:
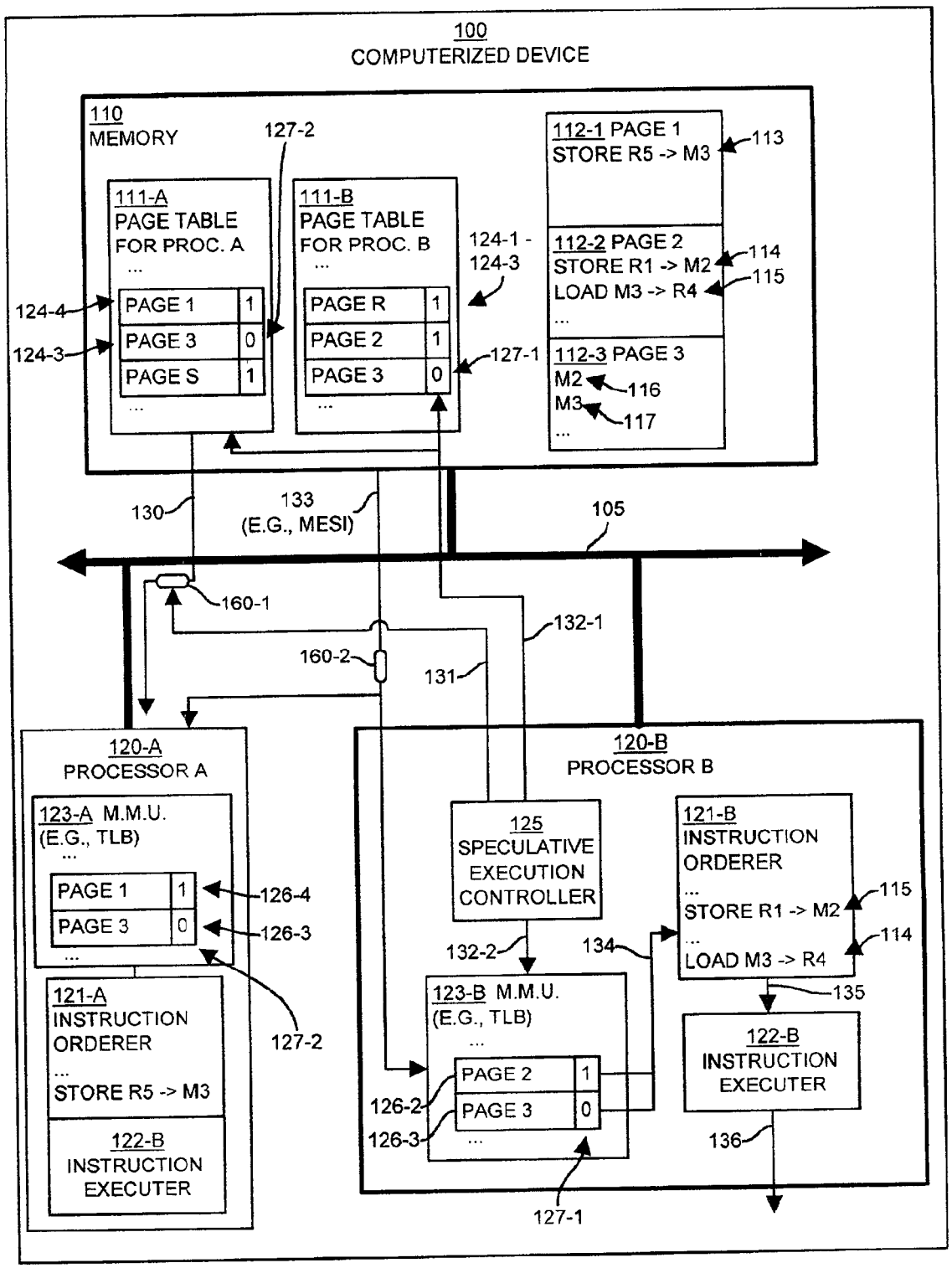
FIG. 3 illustrates another example architecture of a computerized device configured in accordance with another embodiment of the invention.

FIG. 3 illustrates a more detailed example of a computerized device 100 configured according to another embodiment of the invention. In this example, the memory 110 is configured somewhat differently from the former example in FIG. 1. In particular, the memory page 112-1 (PAGE 1) in the memory 110 includes an example of program code containing instruction 113 (STORE R5->M3) which, when executed on/by a processor 120 within the computerized device 100 stores the contents of the register R5 to memory location M3 that exists within the memory page 112-3 (PAGE 3). Within the memory page 112-2 (PAGE 2), other program code contains a store instruction 114 (STORE R1->M2) followed by a load instruction 115 (LOAD M3->R4). In this example, the program code contained within the memory page 112-1 (i.e., including the instruction 113) executes upon the first processor 120-A whereas the program code contained within the memory page 112-2 (i.e., including the instructions 114 and 115) executes on the second processor 120-B.

Also in this example, instead of a singular page table 111, the example configuration in FIG. 3 includes page tables 111-A and 111-B that are associated with the processors 120-A and 120-B, respectively. Each page table 111-1 and 111-B contains a respective set of page table entries 124 associated with program code and/or data that can operate on or be referenced by the processor 120 to which that page table 111 is associated. In other words, the set of page table entries 124 within page table 111-A are associated with programs that execute upon the first processor 120-A, whereas the page table entries within the page table 111-B are associated with programs that execute upon the second processor 120-B. The example illustrated in FIG. 3 also shows an instruction orderer 121-A and an instruction executor 122-A operating within the first processor 120-A.

Further still, in this alternative configuration, each page table entry 124 in memory 110 includes a respective speculation indicator 127. The speculative execution controller(s) 125 operating in each processor 120 can update the speculation indicators 127 in the page table entries 124 in the memory 110 upon detecting a memory access condition. Accordingly, in the embodiment discussed above with respect to FIG. 1, the speculation indicators 127 are "hidden" in the in-processor translation lookaside buffer entries. However, in this alternative embodiment, such speculation indicators 127 are located in the page table entries within memory 110. Such placement may make them accessible to software.

In operation of the example embodiment illustrated in FIG. 3, the first processor 120-A begins execution of the program code contained within the memory page 112-1. Since the first processor 120-A is executing program code from within the memory page 112-1, the translation lookaside buffer within the memory management unit 123-A includes an entry 126-4 containing the contents of the page table entry 124-4 corresponding to the memory page 112-1 (PAGE 1). When the first processor 120-A encounters the store instruction 113 (STORE R5->M3) during execution, since this instruction 113 references memory location "M3" 117 contained within the memory page 112-3, the memory management unit 123-A (within the first processor 120-A) establishes a page table entry 124-3 within its respective page table 111-A to map logical to physical addresses for the memory page 112-3 containing the contents of the memory location M3. In addition, as indicated at location 130 in FIG. 3, the memory management unit 123-A performs an access 160-1 to the page table entry 124-3 (for PAGE 3) from its respective page table 111-A for insertion into the translation lookaside buffer within the memory management unit 123-A. In other words, the first processor 120-A performs an access 160-1 to fill the translation lookaside buffer with the page table entry 143-3 from the page table 111-A so that the store instruction 113 executing within the first processor 120-A is able to access the contents of the memory location 117 "M3".

Directing attention now to the execution operations taking place within the second processor 120-B, the processor 120-B is executing the code contained within the memory page 112-2 which includes the store and load instructions 114 and 115. Since the memory locations M2 116 and M3 117 referenced by these instructions 114 and 115 are contained within the memory page 112-3, the memory management unit 123-B in the second processor 120-B includes respective translation lookaside buffer entries 126-2 and 126-3 for the two pages of memory 112-2 and 112-3 that contain the program code (i.e., instructions 114 and 115) and data (i.e., M2 116 and M3 117) being executed or referenced at this time within the second processor 120-B.

According to operations of embodiments of the invention as previously explained with respect to FIGS. 1 and 2, the speculative execution controller 125 operating within the second processor 120-B is able to detect a multiaccess memory condition by determining when the first processor 120-A becomes capable of accessing the memory location, which is page 112-3 (PAGE 3) in this example, which the second processor 120-B is also capable of accessing. To detect such a multiaccess memory condition, at the point at which the memory management unit 123-A performs the access 160-1 to the page table entry 124-3 (in order to insert the page table entry into its translation lookaside buffer as explained above), the speculative execution controller 125 operating within the second processor 120-B detects and retrieves (i.e., monitors to determine the contents or address of) the access to the page table entry 160-1 by operating a multiprocessor cache coherency protocol such as an MESI protocol.

The cache coherency protocol detects and retrieves (i.e., monitors) all memory transactions made by other processors to the memory 110 to ensure cache coherency. In this embodiment of the invention, the speculative execution controller 125 can use this pre-existing feature of the protocol to monitor or "snoop" memory transactions. Upon detecting a page table entry transaction 160 (e.g., a load of a block of memory containing the page table entry), the speculative execution controller 125 can inspect the data and signals driven on the bus 105 by the cache coherency protocol to determine that it is a page table entry. As an example, the speculative execution controller 125 may be aware of the page table 111 address range in the memory 110 (for page tables of other processors 120, or of the single page table 111 if only one page table is used). When the speculative execution controller 125 "sees" the cache coherency protocol return "snooped" data falling within this page table address range, then the speculative execution controller 125 can assume that access was made, by another processor from which the data was "snooped", to the page table entry at this location. The speculative execution controller 125 can then either obtain the data concerning the content of the page table entry from the "snooped" data, or alternatively, can access the page table 111 itself to obtain the entry from memory 110, and can then compare this entry with translation lookaside buffer entries 126 of the speculative execution controller's associated processor in order to determine if any translation lookaside buffer entries match this page table entry access by another processor.

To this end, in response to detecting the access 160-1 by the first processor 120-A to the page table entry 124-3 referencing the memory page 112-3, the speculative execution controller 125 can detect that the page table entry 124-3 referenced by the access 160-1 of the first processor 120-A matches the page table entry contained within translation lookaside buffer (i.e., the translation lookaside buffer entry 126-3) associated with the second processor 120-B. In other words, the speculative execution controller 125 within the second processor 120-B is able to identify potentials of the first and second processor to access the same memory location since each processor has the same translation lookaside buffer entry content, and thus instructions executing on such processors might concurrently reference the same memory location, or may do so in an alternating fashion that creates a hazard condition if instructions were to be executed out of order.

As a result of the detection of this multiaccess memory condition, the speculative execution controller 125 sets a speculation indicator 127-1 and 127-2 within the page table entry 124-3 contained in each of the respective page tables 111-A and 111-B (for each processor having the matching entry) to indicate that speculative execution of instructions is not allowed for instructions executed by any processor 120 that references memory referenced by that page table entry 124-3. In other words, in response to the speculative execution controller 125 in the second processor 120-B detecting of the first processor 120-A now has the potential to access memory within the memory page 112-3 (such as memory locations M2 or M3 116, 117), the speculative execution controller 125 sets the speculation indicator 127-1 associated with all page table entries 124-3 that are associated with this memory page 112-3 to indicate that speculative execution of instructions is not allowed this for instructions that are contained in what contained memory references to this memory page 112-3. In this example, the speculative execution controller 125 sets the speculation indicator 127-1 and 127-2 within the page table entry 124-3 contained in each of the respective page table 111-A and 111-B to a value of "0" to reflect the speculative execution for these pages is not allowed. If only one page table 111 is used, then only the speculation indicator 127 for the single entry accessed by both processors 120 needs to be set accordingly.

Upon performing this operation, in one embodiment of the invention, the speculative execution controller 125 effectively modifies, as shown at location 132-1, the page table entries 124-3 (that references memory page 112-3) existing within each page table 111 by changing their respective speculation indicators 127-1 and 127-2 to indicate that speculative execution of instructions is not allowed for instructions or data related to the memory page 112-3. As a result of such a modification, the cache coherency protocol (e.g., an MESI protocol) further operates as shown at location 133 to update 160-2 all references within the cache of all processors 120 in the computerized device 100 (i.e., cached references to the page table entry 124-3 in the memory 110) to reflect the updated speculation indicator values 127-1 and 127-2. As a result of this operation, the translation lookaside buffer entries 126-3 are updated to contain a page table entry mapping for the memory page 112-3 including speculation indicators 127-1 and 127-2 that indicate that speculative execution of instructions is not allowed for instructions contained in or data referenced in the page 112-3. As illustrated in the instruction orderer 121-B operating in the second processor 120-B, the instruction orderer thus does not reorder the store and load instructions 114 and 115. In other words, the instruction orderer 121-B does not speculatively execute the load instruction 115 before the store instruction 114 since the load instruction 115 contains a reference to the memory location M3 117 which is contained within the memory page 112-3 for which the translation lookaside buffer entry 126-3 has an associated speculation indicator 127-1 that indicates that speculative execution is not allowed for any instructions contained within, or that reference data within, the memory page 112-3.

The aforementioned embodiment of the invention thus operates the speculative execution controller 125 to modify or set the appropriate value of a speculation indicator 127 within page table entries 124 which reference pages of memory 112 that are shared by multiple processors 120 within the computerized device. As a result of such modification to the speculation indicator 127, a cache coherency protocol operates within the computerized device 100 to have an effect of distributing this modification of the speculation indicator 127 into any translation lookaside buffer entries 126 which reference to modified page table entry 124. In other words, in this embodiment of the invention, the speculative execution controller only needs to modify 132-1 respective speculation indicators 127 in memory and can rely on a cache coherency protocol to transpose this modification to any translation lookaside buffer entries 126 which correspond to the modified memory locations. To ensure that the cache coherency protocol will detect such modifications, embodiments of the invention that operate as previously explained can be configured to always maintain, within their cache, a copy of all translation lookaside buffer entries 126, such that coherency between translation lookaside buffer entries 126 and memory locations (i.e., page table entries) to which they correspond are continuously kept in synchronization with each other by the cache coherency protocol.

In an alternative configuration of the invention, the speculative execution controller 125 can perform the snooping operation 131 as illustrated FIG. 3 to detect other processors 120 that access page table entries from the memory 110 and can then compare, as illustrated at location 132-2 such accesses (i.e., the snooped contents of 160-1) to translation lookaside buffer entries 126 (126-2 and 126-3 in FIG. 3) contained within the memory management unit 123-B for the processor in which speculative execution controller 125 is operating to detect any matching entries 126. Upon detecting matching entries, or in other words, upon detecting that another processor has now accessed a page table entry that corresponds to a page table entry already loaded into the translation lookaside buffer for the processor operating the speculative execution controller 125, the speculative execution controller 125 can modify (i.e., 132-2) the speculative indicator 127-1 within the appropriate translation lookaside buffer entry 126 (e.g., 126-3 in the example illustrated FIG. 3) such that the speculation indicator 127-1 indicates that speculative execution of instructions is not allowed for instructions that relate to (i.e., that are contained within the referenced data within) the page of memory 112-3 referenced by the matching translation lookaside buffer entry 126-3. That is, in addition to or as an alternative to modifying the speculation indicator 127-1 and 127-2 within the page table entries 124 of each page table 111 in the memory 110 upon detecting the potential for two processors to share a page of memory, the speculative execution controller 125 configured according to this embodiment of the invention can also (or needs only to) modify translation lookaside buffer entries 126 that correspond to the page table entries 124 within the processors themselves (i.e., within any other processors that also have a TLB entry corresponding to this page table entry) so that the speculation indicator 127 in both the page table entries 124 and in the appropriate translation lookaside buffer entries 126 are appropriately set. This embodiment thus avoids having to rely on the cache coherency protocol to transfer the update to the speculation indicator 127 in the memory 110 to the appropriate translation lookaside buffer entry 126, as described the previous embodiment.

In an alternative embodiment, the speculative execution controller 125 can modify speculation indicators 127 in memory for the page table 111 and for the appropriate entry 126 in its translation lookaside buffer, while relying on the cache coherency protocol to transpose the memory modifications to other translation lookaside buffers in other processors 120.

Figure 4:
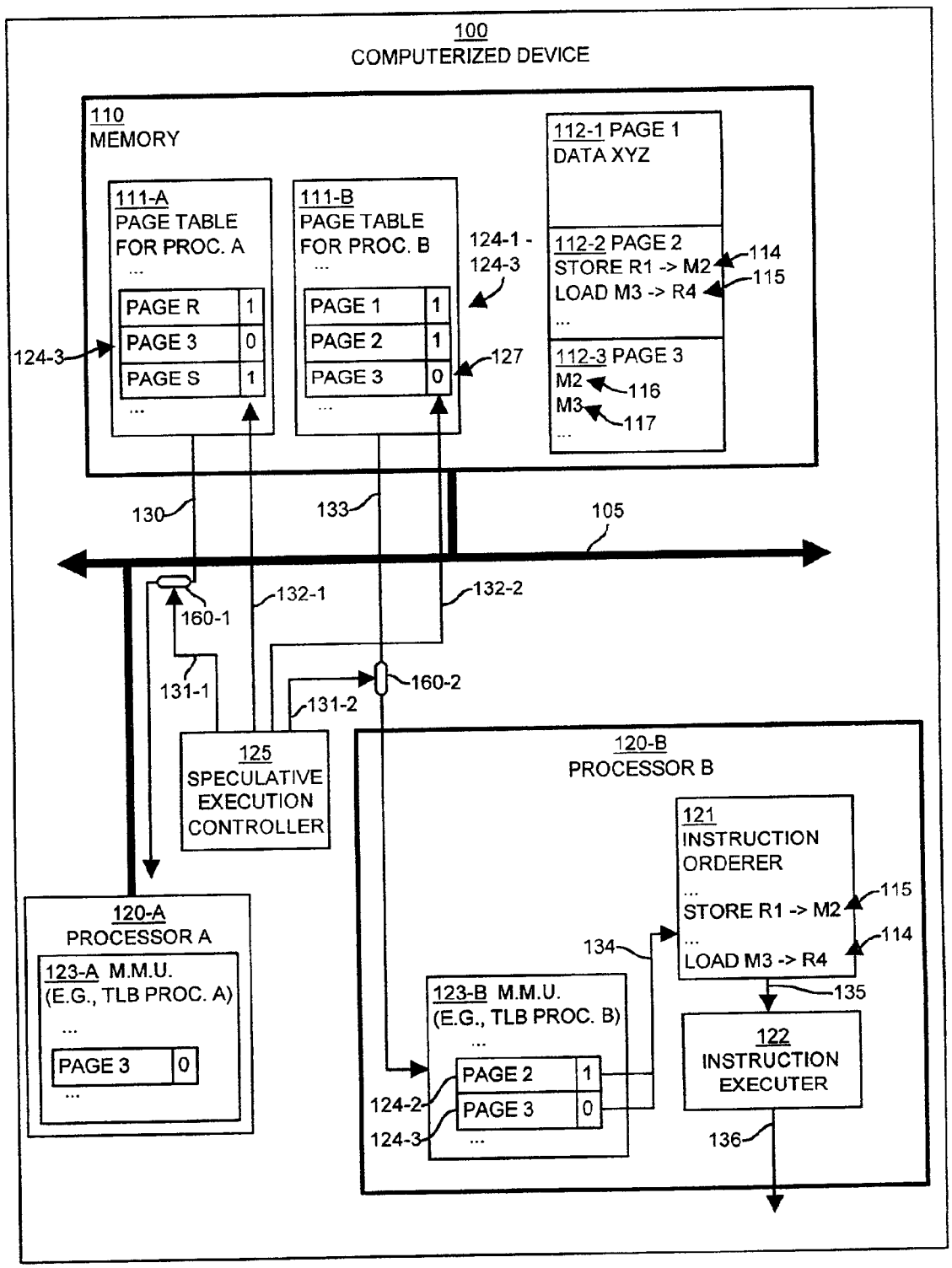
FIG. 4 illustrates another example architecture of the computerized device configured in accordance with another embodiment of the invention that operates a multiaccess execution environment.

FIG. 4 illustrates yet another configuration of the computerized device 100 configured according to one embodiment of the invention. Generally, in this embodiment, the speculative execution controller 125 is provided as a separate component within the computerized device 100. In other words, the speculative execution controller 125 to is not contained as part of each processor 120 but rather, operates as an independent component (or shared component) which can detect access is 160-1 and 162 to page table entries made by all processors 120 operating within the computerized device 100. In response to detecting accesses 160 to page table entries 124 shared by two or more processors 120, the speculative execution controller 125 can set the appropriate speculation indicators 127 within a page table entry(s) 124 for such shared memory pages 112 to indicate that speculative execution of instructions is not allowed for memory references to such pages 112. Thereafter, once the speculative execution controller 125 has appropriately set the speculation indicators 127 for any page table entries 124 which are shared between processors 120, the cache coherency protocol operates between such processors 120 as explained above to detect such a memory modification (i.e., can detect the update to the speculation indicator 127) and can propagate such a change to the appropriate translation lookaside buffer entries 126 within each processor 120. In this manner, the speculative execution controller 125 illustrated in FIG. 4 operates independently from any one particular processor 120.

Figure 5:
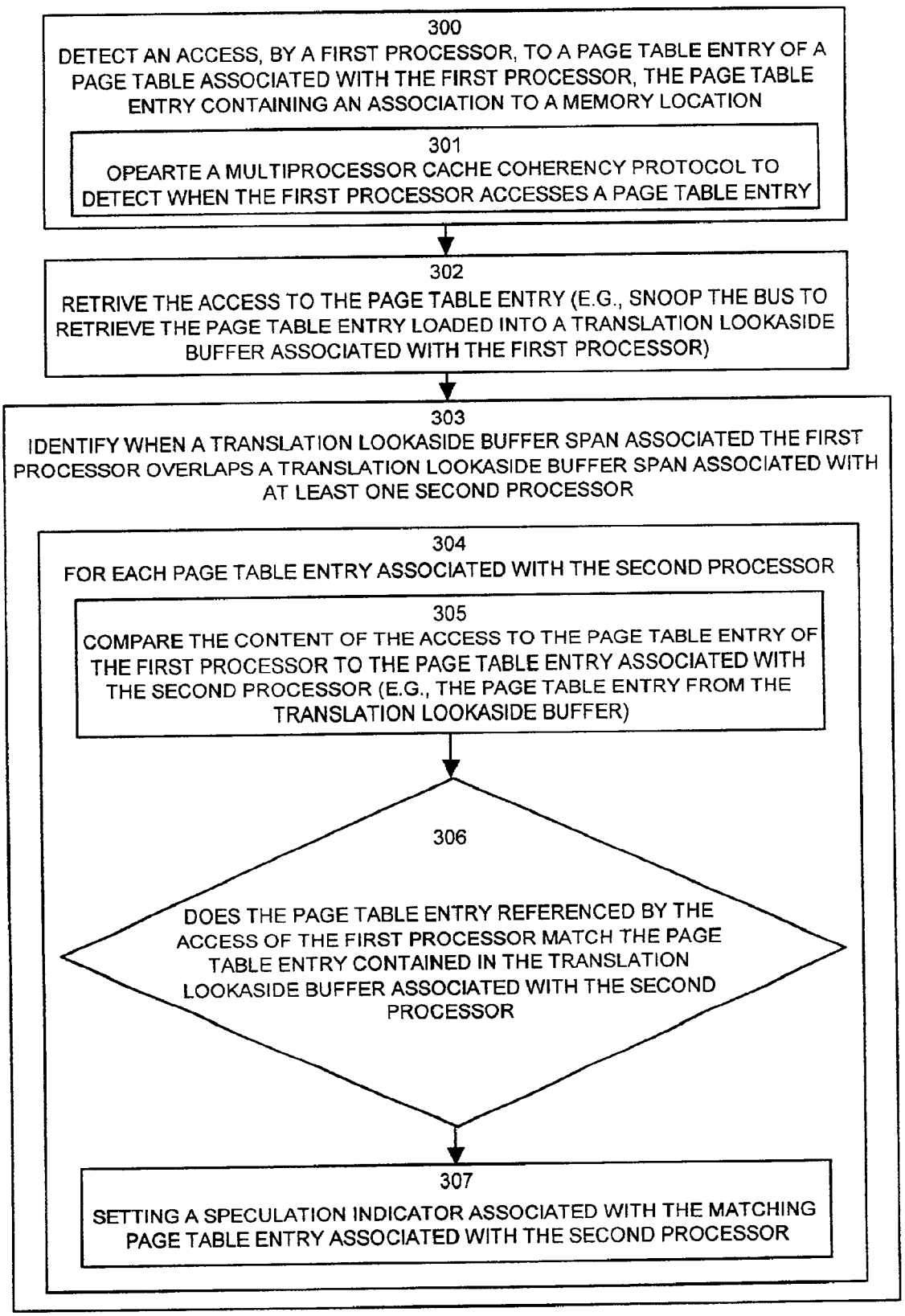
FIG. 5 is a flow chart of processing steps performed according to one embodiment of the invention that can operate in speculative execution controller to detect multiaccess memory conditions in order to control speculative execution of instructions in a computerized device.

FIG. 6 illustrates a flow chart of processing steps that show processing operations performed according to a more detailed embodiment of the invention which operates to control speculative execution of instructions within a computerized device 100. The processing steps shown in FIG. 5 will be explained with reference to being performed by the speculative execution controller 125 configured according to one of the previous embodiments of the invention as explained above.

In step 300, the speculative execution controller 125 detects an access 160, by a first processor (e.g., 120-A), to a page table entry 124 of a page table 111 (e.g., 111-A) associated with the first processor. The page table entry 124 contains an association to a memory location, such as a memory page 112.

As illustrated in step 301, the speculative execution controller 125 operating according to this embodiment of the invention can perform the detection of a processor access (i.e., 160) to a page table entry by operating a multiprocessor cache coherency protocol.

Next, in step 302, the speculative execution controller 125 retrieves the access (i.e., 160) to the page table entry 124. This may be done, for example, by snooping 131 the bus 105 which transports such accesses 160 between the memory 110 and the processors 120 in order to retrieve page table entry loads 130 being loaded into a translation lookaside buffer associated with the processor 120 performing such an access 160.

Next, in step 303, the speculative execution controller 125 identifies when a translation lookaside buffer span associated with the first processor 120-A overlaps a translation lookaside buffer span associated with at least one second processor (e.g., 120-B). In other words, step 303, the speculative execution controller 125 can determine when two or more processors contain translation lookaside buffer entries 126 that contain page table entries that reference the same page of memory 112. In the embodiments in which the speculative execution controller 125 is implemented within each of the processors 120 operating within the computerized device 100, the general operation of step 303 may be performed by examining the contents of the access 160 performed by the other processor 120 (i.e., the access detected by the cache coherency protocol) in comparison to local translation lookaside buffer entries 126 associated with this processor 120 operating the speculative execution controller 125. As discussed above, a value/content-based detect/retrieve/compare technique can be used, or an address-based detect/retrieve/compare technique can be used to determine, in steps 300, 301, 302 and 303, to detect and retrieve a page table access and determine when a page table access 160 by one processor occurs.

Alternatively, in embodiments such as that illustrated in FIG. 4 in which the speculative execution controller 125 is implemented as a separate component within the computerized device 100, the general operation of step 303 may be performed by keeping track of, in a list, queue, or other circuitry or data structure, the set of all recent page table entry accesses 130, 160 performed by each processor 120. In such a configuration, the speculative execution controller 125 thus maintains a list of each page table entry access 160 performed by each processor 120 for the last X accesses 160. The length of each list (i.e., the total number of such page table entry accesses that is tracked) for each respective processor 120 can be equal to the maximum number of translation lookaside buffer entries 126 that may be stored within the memory management units 123 of that processor 120. By maintaining such a list which essentially duplicates the contents of each processors 120 translation lookaside buffer within the speculative execution controller 125, upon detection of an access 160 to a page table entry by one processor 120, the speculative execution controller 125 can compare the contents of this access 160 to the previous cached page table entry accesses 160 in the list for each other processor 120 (i.e., page table entry accesses 160 performed in the past by other processors 120) in order to identify any matching entries 126 which indicate that the translation lookaside buffer spans fro two processors overlap with each other (i.e., between processors that contain matching translation lookaside buffer entries).

Steps 304 through 307 show processing configured according to one embodiment of the invention that identifies when a translation lookaside buffer span associated with a first processor overlaps a translation lookaside buffer span associated with another processor.

In step 304, the speculative execution controller 125 enters a loop that occurs for each page table entry 126 (i.e., each translation lookaside buffer entry) associated with the second processor 120-B. The page table entries 126 processed in a loop defined by step 304 exist in this example within the translation lookaside buffer in the memory management unit 123-B of the second processor. In one implementation, it is to be understood that the loop defined by step 304 is only conceptual in nature and that a hardware mechanism such as a comparator, associated with each translation lookaside buffer entry 126, can be used to perform the comparisons discussed below.

In step 305, the speculative execution controller 125 compares the contents of the access 160 to the page table entry of the first processor 120-A (i.e., the access 160 received from snooping the bus 105 using the multiprocessor cash coherency protocol) to the page table entry associated with the second processor (e.g., the translation lookaside buffer entry 126) obtained from the translation lookaside buffer for the second processor 120-B obtained during this iteration of processing of the loop defined by step 304.

In step 306, the speculative execution controller 125 determines if the page table entry referenced by the access 160 to the page table entry of the first processor 120-A matches the page table entry 126 contained in the translation lookaside buffer associated with the second processor 120-B. If there is a match, processing proceeds to step 307 to set a speculation indicator 127 associated with the matching translation lookaside buffer entry 126 associated with a second processor 120-B. As illustrated in the former examples of different embodiments of the invention, the processing of step 307 can, in one case, set a speculation indicator 127 within the page table entry 124 in a page table 111 existing within the memory system 110, or alternatively (or in addition to that), the speculative execution controller 125 can set a speculation indicator 127 associated with the particular matching translation lookaside buffer entry 126. In the first case of setting a speculation indicator in a page table 111 of a page table entry 124 in the memory 110, a cache coherency protocol can be used to detect the change to the memory and will automatically update the change to the appropriate translation lookaside buffer entry 126 in order to keep the translation lookaside buffer entries 126 (i.e., permanently maintained in the cache of each processor) coherent or consistent or synchronized with their corresponding translation look aside buffer entries 126 in other processors, or within page table entries 124 existing within the memory 110. In embodiments in which the speculation indicator 127 is only existent within translation lookaside buffer entries 126 (and not in each page table entry in the memory 110), no update to the memory 110 is performed and thus the speculative execution controller 125 in step 305 compares the page table entry accessed by the other processor to any page table entries 126 within its translation lookaside buffer.

In step 306, if the page table entry defined in the access 160 to the page table entry by the first processor 120-A does not match the particular translation lookaside buffer entry 126 contained in the translation lookaside buffer (i.e., does not match an entry 126) associated with the second processor 120-B, than the speculative execution controller 125 does not change the value of a speculation indicator 127 associated with that translation lookaside buffer entry 126.

The processing of the loop defined by step 304 repeats for each translation lookaside buffer entry 126 associated with the second processor 120-B such that after completion of the loop defined by step 304, the access 160 made by the first processor 120-A to a page table entry 124 from the memory 110 will be compared with each translation lookaside buffer entry 126 in the second processor 120-B and if any translation lookaside buffer entries 126 match the page table entry 124 in the access 160, the speculation indicator 127 associated with that entry 126 (and associated with the corresponding page table entry 124) are set to indicate the speculative execution of instructions (e.g., 114, 115) contained within the related page 112 to the entry 126 or within data (e.g., M2, M3) referenced by code within that page should not be subject to speculative execution within the second processor 120-B.

In this manner, embodiments of the invention can utilize a cache coherency protocol which is responsible for maintaining synchronicity between the memory 110 and a cache within each processor 120 (the cache including translation lookaside buffer entries 126 in the memory management unit in these examples) in order to detect page table entry accesses by two or more processors 120 and can thus set a speculation indicator 127 associated with pages in memory corresponding to those page table entries to indicate the speculative execution of instructions is not to be permitted for those pages. The instruction orderer 121 within each processor 120 senses the value of the speculation indicators 127 and thus appropriately engages or disengages speculative execution of instructions. By disabling speculative execution for pages shared by two or more processors, embodiments of the invention can alleviate hazards associated with speculative execution of instructions in a computerized device and can eliminate the requirement for speculative execution correction mechanisms such as memory order buffers or advance look ahead tables.

Embodiments of the invention can also manage clearing or resetting speculation indicators associated with page table entries once such indicators are set in a state that disallows speculative execution of instructions. This avoids a page table entry from being "stuck" in a shared state for a prolonged period of time in which speculative execution is not allowed. According to one configuration, page table entries stored in a translation lookaside buffer experience a normal eviction or attrition rate as newer page table entries are accessed and placed into the translation lookaside buffer. During the normal replacement (i.e., eviction) operation of a TLB or cache line entry, the speculation indicator is reset during the eviction procedure to indicate that the new page table entry will have a speculation indicator indicating that speculative execution of instructions is allowed for references related to the page of memory associated with the new page table entry. Since in most processor architectures, caches are relatively small, such processor architectures equipped with the invention have a sufficient rate of TLB entry or cache line eviction to ensure that a page is not "stuck" in the no-speculation allowed state (i.e., speculation indicator off) for long periods of time.

In an alternative embodiment of the invention, after setting speculation indicators to a state that disables speculative execution of instructions for one or more pages (i.e., after setting speculation indicators for one or more TLB entries), when processing is complete of a program or certain portions of a program or programs that trigger or cause speculation to not be allowed, the operating system can flush or clear all TLB entries or cache lines in order to reset all speculation indicators to a default state of again allowing speculation. In an variation of this embodiment, the operating system or other means such as circuitry within the processor can flush or otherwise reset TLB or cache line entries (or the speculation indicators associated with those entries) for only those entries that have the speculation indicator set to a state that indicates speculative execution of instructions is not allowed. In other words, a computerized device can be equipped to detect a reset condition indicating that speculation indicator(s) are to be reset in the computerized device. The end of processing or execution of a program or code segment that caused one or more speculation indicator to be set in the first place can trigger the reset condition, for example. When such a program is finished processing, the operating system that begins executing another portion of code for another process can trigger the reset condition to reset the speculation indicators of either all TLB or cache line entries, or of only those that were set to the non-default state of speculation disallowed.

In embodiments in which the speculation indicator is one or more bits or an explicit field in in-memory page table entries, the operating system or another means such as on-processor circuitry can perform periodic sweeps to flush and clear speculation indicator bits, for example, upon completion of execution of a program or process which caused such bits to be set to disallow speculative execution in the first place.

It is to be understood that embodiments of the invention provide a speculation indicator as one or more bits within with one or more respective page table entries and/or as one or more bits within one or more respective translation lookaside buffer entries. In addition, the speculation indicator can be one or more control bits associated with one or more pages of memory such as a code page containing a load instruction, a code page containing a store instruction, a data page containing (or referenced by) a load instruction, or a data page containing (or referenced by) a store instruction, or any combination thereof. If an embodiment of the invention sets the speculation indicator bit(s) for a particular page of memory to indicate speculative execution is allowed in the processor accessing that page, then the speculative execution controller a125 can allow the processor to speculatively reorder and execute instructions such as load and store instructions for any instructions in code and/or data contained within that (or those) page (or pages) in memory. Accordingly, certain pages in memory can have the speculation indicator set to "on" or true in their page table entry and hence in their corresponding translation lookaside buffer entry, thus allowing speculative execution of instructions such as loads in code residing in (or in data contained in) those pages in memory while other pages in memory can have their associated speculation indicator set to "off" in the page table and translation lookaside buffer entries, in which case the processor is not allowed to speculatively execute instructions such as loads in the code existing within those pages in memory, or for data referenced in those pages by load and/or store instructions. If the page table entries in a page table 111 are not used to store the speculation indicators, then whatever memory location are used to store such speculation indicators 127 can be always maintained in cache in each processor, such that changes to those locations in memory will be picked by the cache coherency protocol.

From the foregoing discussion of embodiments of the invention, those skilled in the art will understand that the embodiments of the invention provide a mechanism to control when a processor performs speculative execution of instructions. It is to be understood that there can be many variations made to the embodiments explained above while still achieving the same objective of those embodiments and the invention in general. For example, those skilled in the art will understand the various steps shown in the flow charts in FIGS. 2 and 5 can be rearranged in order while still accomplishing the same effect as the steps accomplish in the order shown.

Such variations are intended to be covered by the scope of this invention. As such, the foregoing description of embodiments of the invention are not intended to be the limiting. Rather, any limitations to the invention are presented in the following claims.

What is claimed is:

1. In a computerized device, method for controlling speculative execution of instructions, the method comprising the steps of:

detecting a multiaccess memory condition based on a reference to a memory location common to a plurality of page table entries, the page table entries each corresponding to at least a first processor and a second processor;

setting a value of a speculation indicator based on the multiaccess memory condition to indicate that speculative execution of instructions by at least one of the first and the second processors is not allowed in the computerized device for instructions that reference the memory location;

if the value of the speculation indicator indicates that speculative execution of instructions is allowed in the computerized device, allowing speculative execution of instructions in a processor in the computerized device; and if the value of the speculation indicator indicates that speculative execution of instructions is not allowed in the computerized device, not allowing speculative execution of instructions in the processor in the computerized device.

2. The method of claim 1 wherein the step of detecting a multiaccess memory condition comprises the steps of:

identifying a potential of the first processor the access the memory location;

identifying a potential of the second processor to concurrently access the memory location; and wherein in response to the steps of identifying, the step of setting a value of a speculation indicator comprises the step of setting the value of the speculation indicator to indicate that speculative execution of instructions by at least one of the first and second processors is not allowed in the computerized device for instructions that reference the memory location.

3. The method of claim 2 wherein the step of identifying a potential of a first processor to access a memory location comprises the step of:

detecting an access, by the first processor, to the page table entry of a page table associated with the first processor, the page table entry containing an association to the memory location; and retrieving the access to the page table entry; and wherein the step of identifying a potential of a second processor to access the memory location comprises the steps of:

comparing the content of the access to the page table entry of the first processor to a set of page table entries associated with the second processor to identify the page table entry associated with the second processor that references the memory location associated with the access to the page table entry by the first processor.

4. The method of claim 3 wherein the step of comparing the content of the access to the page table entry of the first processor to a set of page table entries associated with the second processor comprises the step of:

detecting that a page table entry referenced by the access to the page table entry of the first processor matches a page table entry contained in a translation lookaside buffer associated with the second processor.

5. The method of claim 2 wherein the step of identifying a potential of a first processor to access a memory location comprises the step of:

retrieving an access to a page table entry by a first processor;

wherein the step of identifying a potential of a second processor to access the memory location comprises the step of:

detecting that the page table entry accessed by the first processor matches a page table entry referenced by a memory management unit of the second processor; and wherein the speculation indicator is associated with the matching page table entry referenced by a memory management unit of the second processor; and in response to the steps of retrieving and detecting, the step of setting a value of a speculation indicator comprises the step of:

setting a speculation indicator associated with the page table entry referenced by a memory management unit of the second processor to indicate that speculative execution of instructions is not allowed for instructions executed by the second processor that reference memory referenced by the page table entry.

6. The method of claim 1 wherein the step of detecting a multiaccess memory condition comprises the step of:

detecting when at least two processors in the computerized device have a potential to execute instructions that reference locations within a shared page of memory.

7. The method of claim 6 wherein the step of detecting when at least two processors in the computerized device have a potential to execute instructions that reference locations within a common page of memory comprises the steps of:

monitoring a first processor translation lookaside buffer reference to a page table associated with a first processor;

comparing the first processor translation lookaside buffer reference to a set of translation lookaside buffer references associated with a second processor; and setting a value of the multiaccess memory condition to indicate that speculative execution of instructions is not allowed by at least the second processor if the first processor translation lookaside buffer reference is associated with memory reference by at least one translation lookaside buffer reference associated with the second processor.

8. The method of claim 1 wherein the step of detecting a multiaccess memory condition comprises the step of:

identifying when a translation lookaside buffer span associate with a first processor overlaps a translation lookaside buffer span associated with at least one second processor; and in response to the step of identifying, the step of setting a value of a speculation indicator based on the multiaccess memory condition comprises the step of:

setting the value of the speculation indicator indicate that speculative execution of instructions is not allowed for portions of the translation lookaside buffer that overlap with one another.

9. The method of claim 8 wherein:

the speculation indicator is associated with a page table entry containing a reference to memory referenced by at least one instruction operating on the processor in the computerized device;

the step of setting the value of the speculation indicator sets the value of the speculation indicator to indicate that speculative execution of instructions is not allowed in the computerized device for pages of memory referenced by translation lookaside buffer entries in at least two processor in the computerized device;

and wherein the step of not allowing speculative execution of instructions in the computerized device comprises the steps of:

disallowing speculative execution of instructions by a processor in the computerized device if a speculation indicator associated with any page table entries that contain references to memory referenced by instructions to be executed in that processor indicate that speculative execution of instructions is not allowed in the computerized device.

10. The method of claim 9 wherein the step of not allowing speculative execution of instructions in the computerized device comprises the steps of deactivating at least one speculative execution correction mechanism in the computerized device.

11. The method of claim 1 wherein the stop of detecting a multiaccess memory condition comprises the step of:

determining when at least two processors in the computerized device do not have a potential to execute instructions that reference locations within a shared page of memory; and in response to the step of determining, the step of setting a value of a speculation indicator comprises the step of setting the value of the speculation indicator to indicate that speculative execution of instructions is in the computerized device.

12. The method of claim 1 wherein the step of setting a value of a speculation indicator based on the multiaccess memory condition comprises the steps of:

detecting a change in the value of the speculation indicator from a value indicating speculative execution of instructions is allowed in a processor in the computerized device to a value that indicates that speculative execution of instructions is not allowed in that processor in the computerized device; and in response to the step of detecting a change in the value of the speculation indicator, performing a speculative execution recover operation for any instructions that have been speculatively executed and which are adversely affected by the change in the value of the speculation indicator.

13. The method of claim 1 wherein the step of detecting a multiaccess memory condition comprises the step of:

operating a multiprocessor cache coherency protocol to detect when a processor in the computerized device accesses a page table entry.

14. The method of claim 1 further comprising the step of executing instructions in the processor in the computerized device.

15. In a computerized device, a method for controlling speculative execution of instructions, the method comprising the steps of;

detecting a multiaccess memory condition, detecting a multiaccess memory condition further comprises:
identifying when a translation lookaside buffer span associated with a first processor overlaps a translation lookaside buffer span associated with at least one second processor; and
setting a value of a speculation indicator based on the multiaccess memory condition;
in response to the step of identifying, the step of setting a value of the speculation indicator based on the multiaccess memory condition comprises the step of:
setting the value of the speculation indicator to indicate that speculative execution of instructions is not allowed for portions of the translation lookaside buffer that overlap with one another;

allowing, if the value of the speculation indicator indicates that speculative execution of instructions is allowed in the computerized device, speculative execution of instructions in a processor in the computerized device; and disallowing, if the value of the speculation indicator indicates that speculative execution of instructions is not allowed in the computerized device, speculative execution of instructions in the processor in the computerized device;

the speculation indicator being associated with a page table entry containing a reference to memory referenced by at least one instruction operating on the processor in the computerized device;

the step of setting the value of the speculation indicator includes setting the value of the speculation indicator to indicate that speculative execution of instructions is not allowed in the computerized device for pages of memory referenced by translation lookaside buffer entries in at least two processor in the computerized device;

the step of not allowing speculative execution of instructions in the computerized device further comprising:
disallowing speculative execution of instructions by a processor in the computerized device if a speculation indicator associated with any page table entries that contain references to memory referenced by instructions to be executed in that processor indicate that speculative execution of instructions is not allowed in the computerized device; and
deactivating at least one speculative execution correction mechanism in the computerized device.

16. A processor configured to control speculative execution of instructions in a computerized device, the processor comprising:

an instruction orderer configured to receive and order a set of instructions for execution based on a speculation indicator;

an instruction executer coupled to the instruction orderer, the instruction executer configured to execute instructions in the set of instructions according to an order indicated by the instruction orderer;

a speculation indicator configured to receive and maintain a value that indicates if speculative execution of instructions is allowed in the processor; and a speculative execution controller coupled to at least one of the instruction orderer and the instruction executer and coupled to he speculation indicator, the speculative execution controller configured to:

detect a multiaccess memory condition based on a reference to a memory location common to a plurality of page table entries, the page table entries each corresponding to at least a first processor and a second processor;

set a value of a speculation indicator based on the multiaccess memory condition to indicate that speculative execution of instructions by at least one of the first and the second processors is not allowed in the computerized device for instructions that reference the memory location;

if the value of the speculation indicator indicates that speculative execution of instructions is allowed in the computerized device, allow speculative execution of instructions in the processor in a computerized device; and if the value of the speculation indicator indicates that speculative execution of instructions is not allowed in the computerized device, not allow speculative execution of instructions in the processor in the computerized device.

17. The processor of claim 16 wherein when the speculative execution controller is configured to detect a multiaccess memory condition, the speculative execution controller is further configured to:

identify a potential of the first processor in a computerized device to access a memory location;

identify a potential of the processor comprising the speculative execution controller to concurrently access the memory location; and wherein when the speculative execution controller is configured to perform the operations of identifying, the speculative execution controller is configured to set the value of the speculation indicator to indicate that speculative execution of instructions by at least one of the first and second processors is not allowed in the computerized device for instructions that reference the memory location.

18. The process of claim 17 wherein when the speculative execution controller is configured to identify a potential of the first processor to access a memory location, the speculative execution controller is configured to:

detect an access, by the first processor, to the page table entry of a page table associated with the first processor, the page table entry containing an association to the memory location; and retrieve the access to the page table entry; and wherein when the speculative execution controller is configured to identify a potential of a second processor to access the memory location, the speculative execution controller is configured to:

compare the content of the access to the page table entry of the first processor to a set of page table entries associated with the second processor to identify a page table entry associated with the second processor that references the memory location associated with the access to the page table entry by the first processor.

19. The processor of claim 18 wherein the speculative execution controller is configured to compare the content of the access to the page table entry of the first processor to a set of page table entries associated with the second processor, the speculative execution controller is configured to:

detect that a page table entry referenced by the access to the page table entry of the first processor matches a page table entry contained in a translation lookaside buffer associated with the second processor.

20. The processor of claim 17 wherein when the speculative execution controller is configured to identify a potential of a first processor to access a memory location, the speculative execution controller is configured to perform the operations of:

retrieving an access to a page table entry by a first processor;

wherein when the speculative execution controller is configured to identify a potential of a second processor to access the memory location, the speculative execution controller is configured to perform the operations of:

detecting that the page table entry accessed by the first processor matches a page table entry referenced by a memory management unit of the second processor; and wherein the speculation indicator is associated with the matching page table entry referenced by a memory management unit of the second processor; and in response to operations of retrieving and detecting, the operation of setting a value of a speculation indicator causes the speculative execution controller to be configured to perform the operation of:

setting a speculation indicator associated with the page table entry referenced by a memory management unit of the second processor to indicate that speculative execution of instructions is not allowed for instructions executed by the second processor that reference memory referenced by the page table entry.

21. The processor of claim 16 wherein when the speculative execution controller is configured to detect a multiaccess memory condition, the speculative execution controller is configured to:

detect when at least two processors in the computerized device have a potential to execute instructions that reference locations within a shared page of memory.

22. The processor of claim 21 wherein the speculative execution controller is configured to detect when at least two processors in the computerized device have a potential to execute instructions that reference locations within a common page of memory, the speculative execution controller is configured to:

monitor a first processor translation lookaside buffer reference to a page table associated with a first processor;

compare the first processor translation lookaside buffer reference to a set of translation lookaside buffer references associated with a second processor; and set a value of the multiaccess memory condition to indicate that speculative execution of instructions is not allowed by at least the second processor if the first processor translation lookaside buffer reference is associated with memory reference by at least one translation lookaside buffer reference associated with the second processor.

23. The processor of claim 16 wherein when the speculative execution controller is configured to detect a multiaccess memory condition, the speculative execution controller is configured to:

identify when a translation lookaside buffer span associated with a first processor overlaps a translation lookaside buffer span associated with at least one second processor; and in response to such as identification, when the speculative execution controller is configured to set a value of a speculation indicator based on the multiaccess memory condition, the speculative execution controller is configured to:

set the value of the speculation indicator to indicate that speculative execution of instructions is not allowed for portions of the translation lookaside buffer that overlap with one another.

24. The processor of claim 23 wherein:

the speculation indicator is associated with a page table entry containing a reference to memory referenced by at least one instruction operating on the processor in the computerized device;

wherein when the speculative execution controller is configured to set the value of the speculation indicator, the speculative execution controller sets the value of the speculation indicator to indicate that speculative execution of instructions is not allowed in the computerized device for pages of memory referenced by translation lookaside buffer entries in at least two processor in the computerized device;

and wherein when the speculative execution controller is configured to not allow speculative execution of instructions in the computerized device, the speculative execution controller is configured to:

disallow speculative execution of instructions by a processor in the computerized device if a speculation indicator associated with any page table entries that contain references to memory referenced by instructions to be executed in that processor indicate that speculative execution of instructions is not allowed in the computerized device.

25. The processor of claim 24 wherein when the speculative execution controller is configured to not allow speculative execution of instructions in the computerized device comprises, the speculative execution controller deactivates at least one speculative execution correction mechanism in the computerized device.

26. The processor of claim 16 wherein the speculative execution controller is configured to detect a multiaccess memory condition by:

determining when at least two processors in the computerized device do not have a potential to execute instructions that reference locations within a shared page of memory; and in response to determining, setting the value of the speculation indicator to indicate that speculative execution of instructions is allowed in the computerized device.

27. The processor of claim 16 wherein when the speculative execution controller is configured to set a value of a speculation indicator based on the multiaccess memory condition, the speculative execution controller is configured to:

detect a change in the value of the speculation indicator from a value indicating speculative execution of instructions is allowed in a processor in the computerized device to a value that indicates that speculative execution of instructions is not allowed in that processor in the computerized device; and in response to detecting a change in the value of the speculation indicator, performing a speculative execution recover operation for any instructions that have been speculatively executed and which are adversely affected by the change in the value of the speculation indicator.

28. The processor of claim 16 wherein the speculative execution controller is configured to detect a multiaccess memory condition by operating a multiprocessor cache coherency protocol to detect when a processor in the computerized device accesses a page table entry.

29. A processor configured to control speculative execution of instructions in a computerized device, the processor comprising:

an instruction orderer configured to receive and order a set of instructions for execution based on a speculation indicator;

an instruction executer coupled to the instruction orderer, the instruction executer configured to execute instructions in the set of instructions according to an order indicated by the instruction orderer;

a speculation indicator configured to receive and maintain a value that indicates if speculative execution of instructions is allowed in the processor; and a speculative execution controller coupled to at least one of the instruction orderer and the instruction executer and coupled to the speculation indicator, the speculative execution controller configured to:

detect a multiaccess memory condition;

identify when a translation lookaside buffer span associated with a first processor overlaps a translation lookaside buffer span associated with at least one second processor; and set a value of a speculation indicator based on the multiaccess memory condition;

in response to such as identification, when the speculative execution controller is configured to set a value of a speculation indicator based on the multiaccess memory condition, the speculative execution controller is configured to:

set the value of the speculation indicator to indicate that speculative execution of instructions is not allowed for portions of the translation lookaside buffer that overlap with one another; the speculative execution controller further configured to:

if the value of the speculation indicator indicates that speculative execution of instructions is allowed in the computerized device, allow speculative execution of instructions in the processor in a computerized device; and if the value of the speculation indicator indicates that speculative execution of instructions is not allowed in the computerized device, not allow speculative execution of instructions in the processor in the computerized device, the speculation indicator being associated with a page table entry containing a reference to memory referenced by at least one instruction operating on the processor in the computerized device;

the speculative execution controller further configured to set the value of the speculation indicator, the speculative execution controller sets the value of the speculation indicator to indicate that speculative execution of instructions is not allowed in the computerized device for pages of memory referenced by translation lookaside buffer entries in at least two processor in the computerized device;

and wherein when the speculative execution controller is configured to not allow speculative execution of instructions in the computerized device, the speculative execution controller is configured to:

disallow speculative execution of instructions by a processor in the computerized device if a speculation indicator associated with any page table entries that contain references to memory referenced by instructions to be executed in that processor indicate that speculative execution of instructions is not allowed in the computerized device; and deactivate at least one speculative execution correction mechanism in the computerized device.

30. A speculative execution controller comprising:

an interface capable of coupling to an interconnection of a first processor, a second processor, and a memory system in a computerized device;

processing circuitry coupled to the interface configured to:

detect a multiaccess memory condition between the first and second processors via the first interface based on a reference to a memory location common to a plurality of page table entries, the page table entries each corresponding to at least a first processor and a second processor;

set a value of a speculation indicator in the memory system based on the multiaccess memory condition in the computerized device to indicate that speculative execution of instructions by at least one of the first and the second processors is not allowed in the computerized device for instructions that reference the memory location;

if the value of the speculation indicator indicates that speculative execution of instructions is allowed in the computerized device, allow speculative execution of instructions in at least one of the first and second processors; and if the value of the speculation indicator indicates that speculative execution of instructions is not allowed in the computerized device, not allow speculative execution of instructions in at least one of the first and second processors in the computerized device.

31. A computerized device comprising:

a memory system;

a first processor;

at least one second processor;

a speculative execution controller;

an interconnection mechanism coupling the first processor, the second processor, the memory system and the speculative execution controller;

wherein the speculative execution controller is configured to be capable of:

detecting a multiaccess memory condition between the first and second processors based on a reference to a memory location common to a plurality of page table entries, the page table entries each corresponding to at least a first processor and a second processor;

setting a value of a speculation indicator in the memory system based on the multiaccess memory condition to indicate that speculative execution of instructions by at least one of the first and the second processors is not allowed in the computerized device for instructions that reference the memory location;

if the value of the speculation indicator indicates that speculative execution of instructions is allowed in the computerized device, allowing speculative execution of instructions in at least one of the first and second processors in the computerized device; and if the value of the speculation indicator indicates that speculative execution of instructions is not allowed in the computerized device, not allowing speculative execution of instructions in at least one of the first and second processors in the computerized device.

32. A computer program product having a computer-readable medium including computer program logic encoded thereon that, when performed in a computer device having a coupling of a memory system and at least two processors, programs a speculative execution controller to perform the operations of:

detecting a multiaccess memory condition between the first and second processors based on a reference to a memory location common to a plurality of page table entries, the page table entries each corresponding to at least a first processor and a second processor;

setting a value of a speculation indicator in the memory system based on the multiaccess memory condition to indicate that speculative execution of instructions by at least one of the first and the second processors is not allowed in the computerized device for instructions that reference the memory location;

if the value of the speculation indicator indicates that speculative execution of instructions is allowed in the computerized device, allowing speculative execution of instructions in at least one of the first and second processors in the computerized device; and if the value of the speculation indicator indicates that speculative execution of instructions is not allowed in the computerized device, not allowing speculative execution of instructions in at least one of the first and second processors in the computerized device.

* * * * *